United States Patent
Kobayashi

(10) Patent No.: US 8,287,385 B2
(45) Date of Patent: Oct. 16, 2012

(54) GAME DEVICE, GAME PROCESSING METHOD, INFORMATION RECORDING MEDIUM, AND PROGRAM

(75) Inventor: Satoru Kobayashi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 847 days.

(21) Appl. No.: 12/441,134

(22) PCT Filed: Feb. 1, 2007

(86) PCT No.: PCT/JP2007/051659
§ 371 (c)(1),
(2), (4) Date: Mar. 12, 2009

(87) PCT Pub. No.: WO2008/032454
PCT Pub. Date: Mar. 20, 2008

(65) Prior Publication Data
US 2010/0041483 A1    Feb. 18, 2010

(30) Foreign Application Priority Data
Sep. 13, 2006   (JP) ................................. 2006-248614

(51) Int. Cl.
*A63F 13/00* (2006.01)
*A63F 9/24* (2006.01)
*G06F 17/00* (2006.01)
*G06F 19/00* (2011.01)

(52) U.S. Cl. ............................. 463/43; 463/31; 463/36
(58) Field of Classification Search .................... 463/31, 463/36, 43
See application file for complete search history.

(56) References Cited

U.S. PATENT DOCUMENTS
6,217,446 B1   4/2001   Sanbongi et al.
6,371,856 B1   4/2002   Niwa
(Continued)

FOREIGN PATENT DOCUMENTS
EP   1010444 A1   6/2000
(Continued)

OTHER PUBLICATIONS

Office Action of Jun. 6, 2009 for the counterpart Taiwanese Patent Application No. 096104388 and English translation of Office Action, 12 pages.
(Continued)

*Primary Examiner* — Thien F Tran
(74) *Attorney, Agent, or Firm* — Howard & Howard Attorneys PLLC

(57) ABSTRACT

In a game device (200), a storage unit (201) stores a position of a player character, a position of an enemy character, and candidate positions for new enemy character appearance. A measuring unit (202) measures an elapsed time from the start of the game. The calculating unit (203) calculates a reference distance for determining a position where the new enemy character is to be produced based on the elapsed time measured by the measuring unit (202). The reference distance monotonically increases with respect to the elapsed time measured by the measuring unit (202). When a new enemy character is to be produced in the game, an appearance setting unit (204) selects from among the candidates stored in the storage unit (201) the candidate having a distance to the player character that is closest to the reference distance, and sets the selected position as the appearance position of the new enemy character.

11 Claims, 13 Drawing Sheets

U.S. PATENT DOCUMENTS

2003/0158827 A1 8/2003 Ansari et al.
2007/0066403 A1 3/2007 Conkwright
2010/0292008 A1* 11/2010 Matsumura .................... 463/36

FOREIGN PATENT DOCUMENTS

| JP | 10-165647 | 6/1998 |
| JP | 11-053570 | 2/1999 |
| JP | 2003000948 A | 1/2003 |
| JP | 2003/334382 A | 11/2003 |
| JP | 2004-160059 | 6/2004 |
| JP | 2004-337305 | 12/2004 |
| JP | 2006/059381 A | 3/2006 |
| TW | 575449 | 2/2004 |
| TW | I243703 | 11/2005 |
| WO | 2006/112087 A1 | 10/2006 |

OTHER PUBLICATIONS

Supplementary European Search Report for Patent Application No. EP 07707845.9, mailed Mar. 22, 2010, 6 pages.
International Search Report PCT/JP2007/051659 dated Feb. 1, 2007.
Office Action dated Mar. 6, 2012 for U.S. Appl. No. 12/809,970, filed Jun. 21, 2010.
International Search Report for Patent Application No. PCT/JP2008/073011 with English Translation mailed on Mar. 17, 2009, 2 pages.

* cited by examiner

| POSITION OF PLAYER CHARACTER |
|---|
| (PX, PY, PZ) |

FIG.3A

| IDENTIFICATION INFORMATION | POSITION OF ENEMY CHARACTER |
|---|---|
| 0001 | (E1X, E1Y, E1Z) |
| 0002 | (E2X, E2Y, E2Z) |
| ... | ... |

FIG.3B

| IDENTIFICATION INFORMATION | CANDIDATE LIST | | | |
|---|---|---|---|---|
| | FIRST CANDIDATE | SECOND CANDIDATE | ... | ... |
| 0001 | X1, Y1, Z1 | X2, Y2, Z2 | ... | ... |
| 0002 | AREA 1 | AREA 2 | ... | ... |
| ... | ... | ... | ... | ... |

FIG.3C

GAME DEVICE, GAME PROCESSING METHOD, INFORMATION RECORDING MEDIUM, AND PROGRAM

TECHNICAL FIELD

The present invention relates to a game device, game processing method, information recording medium, and program suitable for positioning a character object so as to ensure that the game is not too difficult or too easy for the user.

BACKGROUND ART

There are games wherein a player operates a player character to bring down an enemy character by using a virtual gun or sword in a virtual game space. For example, when an enemy character appears, the player moves the player character to the position or aims at the position to bring the enemy character down. Sometimes the player character is not allowed to advance if the player character is found by the enemy character, unless the player character brings the enemy character down. In many games, when the player character brings down an enemy character, a different enemy character newly appears, and the game is not completed unless the player character brings down the enemy characters that appear one after the other. Game devices cause suitable new enemy characters to appear in accordance with factors such as the position and level of the player character, so as to provide a more interesting development of game and attract the interest of the player. For example, Patent Literature 1 discloses a game system wherein factors such as the number and strength of the enemy characters are controlled based on the number of players participating in the game and the level of the player characters, thereby increasing the interest of the game without greatly reducing game balance.

Patent Literature 1: Unexamined Japanese Patent Application KOKAI Publication No. 2004-160059

DISCLOSURE OF INVENTION

Problem to be Solved by the Invention

Nevertheless, in the conventional game devices, the location at which the enemy character newly appears is predetermined or selected at random. Therefore, sometimes enemy characters appear near the player character one after another. When this happens, a beginner player feels that the level of difficulty is high (the enemy character is strong) or perceives unfairness, regardless of the level in the game or story development of the game, and consequently looses interest in the game. On the other hand, sometimes the enemy characters always appear in locations far away from the player character. When this happens, an advanced player feels that the level of difficulty is low (the enemy character is weak), regardless of the level in the game or story development of the game, and consequently looses interest in the game.

The present invention has been made to overcome such problems, and it is an object of the present invention to provide to a game device, game processing method, information recording medium, and program suitable for positioning a character object so as to ensure that the game is not too difficult or too easy for the users.

Means for Solving the Problem

To achieve the above objective, the following invention will be disclosed according to the principle of the present invention.

A game device according to a first aspect of the present invention is a game device that executes a game wherein a player character configured to move based on player instructions and an enemy character exist within a virtual space, comprising a storage unit, a measuring unit, a calculating unit, and an appearance setting unit.

The storage unit stores a position of the player character, a position of the enemy character, and candidate positions for enemy character appearance, within the virtual space.

The measuring unit measures an elapsed time of the game.

The calculating unit calculates a distance that increases as the measured elapsed time increases.

The appearance setting unit stores, as a position of a new enemy character, a candidate position whose distance from the player character is closest to the calculated distance from among the stored candidate positions for enemy character appearance, to the storage unit.

As a result, the game device causes the enemy character to appear at a position far away from the player character when the elapsed time of the game is long, and causes the enemy character to appear at a position close to the player character when the elapsed game time is short. With this arrangement, the game device causes an enemy character to appear in such a manner as to ensure that the game is not too difficult or too easy for the player. For example, the game device can determine the position of appearance of the enemy character so that the game is not too difficult for a beginner player and not too easy for an advanced player.

For the elapsed time of the game, the elapsed time from an arbitrary event that occurs within the game may be used. The enemy character may be a character object that adversely affects completing the game by the player.

The appearance setting unit may store the position of the new enemy character to the storage unit in such a manner that the number of positions of the enemy characters stored in the storage unit does not exceed a predetermined threshold.

As a result, the game device does not newly cause an enemy character to appear if a predetermined number of enemy characters already exist, even if conditions permit the new appearance of an enemy character. With this arrangement, the game device limits the number of enemy characters so as not to collapse the game balance, thereby ensuring that the game will not be too difficult for the user. For example, with such an arrangement, there will never be too many factors that make it difficult for a beginner of the game to complete the game.

The game device may further comprise a moving unit which moves the position of the enemy character closer to the position of the player character and updates information stored to the storage unit in a case where the position of the player character is a predetermined distance or more away from the position of the enemy character.

As a result, the game device moves a movable enemy character that is already in the game toward the player character. With this arrangement, the game device ensures that the game will not be too easy for the player. For example, with such an arrangement, there will never be too few factors that make it difficult for an advanced player to complete the game.

The appearance setting unit, in a case where of the stored candidate positions for enemy character appearance there are a plurality of candidate positions whose distance from the player character are same, may select at random a candidate position from those candidates and store the selected position to the storage unit as the position of the new enemy character.

As a result, the game device selects a suitable position for causing an enemy character to appear when an enemy character is to be caused to appear and a plurality of appearance candidate positions exist. With such an arrangement, the game device makes it possible to cause an enemy character to appear so as to make the game not too difficult or too easy for the player.

The appearance setting unit may select at random from among the stored candidate positions for enemy character appearance a position from among those included within a predetermined permissible range from a candidate position that locates at a distance closest to the calculated distance, and store the selected candidate position to the storage unit as the position of the new enemy character.

As a result, the game device causes an enemy character to appear near the candidate position for appearance when an enemy character is to be caused to appear. For example, in a case where the game device cannot dispose the enemy character at the preset position when an enemy character is to be caused to appear because another character object is already positioned in that position, the game device instead causes the enemy character to appear near that position. With such an arrangement, the game device makes it possible to cause an enemy character to appear so as to make the game not too difficult or too easy for the player.

The appearance setting unit, in a case where there are a plurality of stored candidate positions for enemy character appearance that are away by the calculated distance or more, may select at random a candidate position from the plurality of candidates and store the selected candidate position to the storage unit as the position of the new enemy character.

As a result, the game device causes the enemy character to appear in a position farther away from the player character than the predetermined distance when an enemy character is caused to appear. With such an arrangement, the game device makes it possible to cause an enemy character to appear so as to ensure that the game is not too difficult for the player. For example, with such an arrangement, there will never be too many factors that make it difficult for a beginner of the game to complete the game.

The appearance setting unit may obtain the movement direction in which the player character moves within a predetermined time period from present, select at random a position in such a manner that the more in the obtained direction a candidate is, the higher the probability of being selected is, and store the selected candidate position to the storage unit as the position of the new enemy character.

As a result, the game device causes the enemy character to readily appear in the movement direction of the player character. With this arrangement, the game device causes an enemy character to appear in such a manner as to make the game not too difficult or too easy for the player.

The appearance setting unit may select at random a position in such a manner that the closer to the calculated distance a candidate locates at, the higher the probability of being selected is, and store the selected candidate position in the storage unit as the position of the new enemy character.

As a result, the game device can cause an enemy character to appear increasingly away from the player character as the elapsed game time increases, making it possible to cause the enemy character to appear in such a manner to ensure that the game is not too difficult or too easy for the player.

This game device may further comprise a deleting unit which deletes a position of the enemy character from the storage unit in a case where the player character wins by attacking the enemy character or in a case where a predetermined length of time has elapsed from a moment the appearance setting unit stored the position of the enemy character to the storage unit.

As a result, the game device appropriately makes the enemy character disappear, thereby ensuring that the game is not too difficult for the player.

A game processing method according to another aspect of the present invention executed on a game device comprising a storage unit, which executes a game wherein a player character that moves based on player instructions and an enemy character exist within a virtual space comprising a measuring step, a calculating step, and an appearance setting step.

The storage unit stores a position of the player character, a position of the enemy character, and candidate positions for enemy character appearance within the virtual space.

The measuring step measures an elapsed time of the game.

The calculating step calculates a distance that increases as the measured elapsed time increases.

The appearance setting step stores, as the position of the new enemy character a candidate position whose distance from the player character is closest to the calculated distance, from among the stored candidate positions for enemy character appearance, to the storage unit.

As a result, a game device that uses this game processing method can cause the enemy character to appear in such a manner as to ensure that the game is not too difficult or too easy. For example, the game processing method makes it possible to determine the position of appearance of the enemy character so that the game is not too difficult for a beginner player and not too easy for an advanced player.

An information recording medium according to another aspect of the present invention stores a program for controlling a computer which executes a game wherein a player character configured to move based on player instructions and an enemy character exist within a virtual space, to function as a storage unit, a measuring unit, a calculating unit, and an appearance setting unit.

The storage unit stores a position of the player character, a position of the enemy character, and candidate positions for enemy character appearance within the virtual space.

The measuring unit measures an elapsed time of the game.

The calculating unit calculates a distance that increases as the measured elapsed time increases.

The appearance setting unit stores, as the position of the new enemy character, a candidate position whose distance from the player character is closest to the calculated distance from among the stored candidate positions for enemy character appearance, to the storage unit.

As a result, the information recording medium, in accordance with the recorded program, can control the computer to function as a game device wherein the enemy character is caused to appear in such a manner to ensure that the game is not too difficult or too easy. For example, the information recording medium makes it possible to determine the position of appearance of the enemy character so that the game is not too difficult for a beginner player and not too easy for an advanced player.

A program according to another aspect of the present invention controls a computer which executes a game wherein a player character configured to move based on player instructions and an enemy character exist within a virtual space, to function as a storage unit, a measuring unit, a calculating unit, and an appearance setting unit.

The storage unit stores the position of the player character within the virtual space, the position of the enemy character, and the candidate positions for enemy character appearance.

The measuring unit measures an elapsed time of the game.

The calculating unit calculates a distance that increases as the measured elapsed time increases.

The appearance setting unit stores, as the position of the new enemy character, a candidate position whose distance from the player character is closest to the calculated distance from among the stored candidate positions for enemy character appearance, to the storage unit.

As a result, the program can control the computer to function as a game device wherein the enemy character is caused to appear in such a manner to ensure that the game is not too difficult or too easy. For example, the program makes it possible to determine the position of appearance of the enemy character in such a manner that the game is not too difficult for a beginner player and not too easy for an advanced player.

The program of the present invention can be recorded on a computer readable information storage medium, such as a compact disk, a flexible disk, a hard disk, a magneto-optical disk, a digital video disk, a magnetic tape, or a semiconductor memory.

The program can be distributed and sold, independently of a computer which executes the program, over a computer communication network. The information storage medium can be distributed and sold, independently of the computer.

Effect of the Invention

According to the present invention, it is possible to position a character object in such a manner as to ensure that the game will not be too difficult or too easy for the users.

BRIEF DESCRIPTION OF DRAWINGS

FIG. 3A An example of the structure of data indicating the position of the player character.

FIG. 3B An example of the structure of data indicating the positions of enemy characters.

FIG. 3C An example of the structure of data indicating the candidate positions for enemy character appearance.

DESCRIPTION OF REFERENCE NUMERALS

Figure 1:
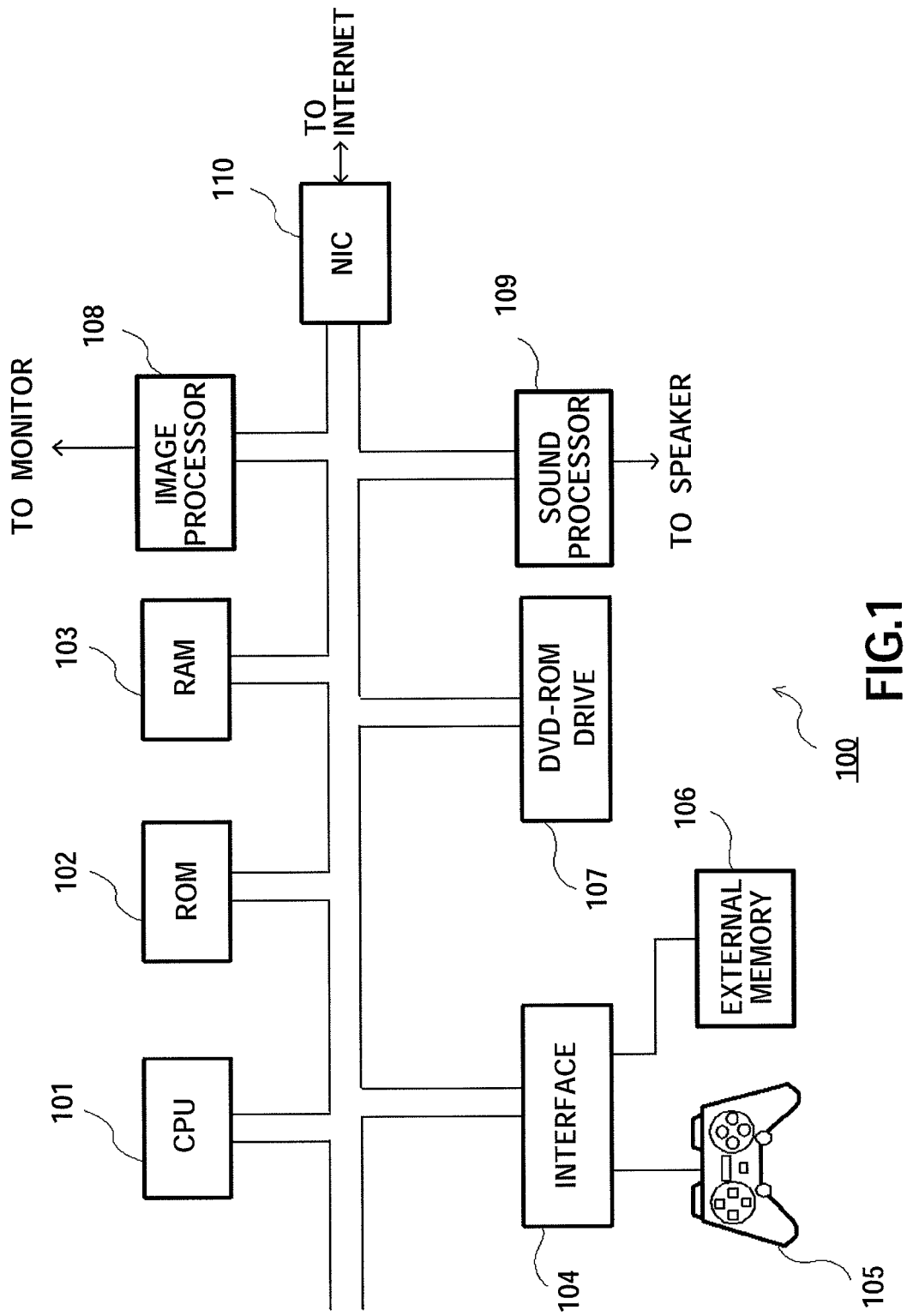
FIG. 1 A diagram illustrating a schematic configuration of a typical information processing device on which a game device of the present invention will be realized.

100 information processing device
101 CPU
102 ROM
103 RAM
104 interface
105 controller
106 external memory
107 DVD-ROM drive
108 image processor
109 sound processor
110 NIC
200 game device
201 storage unit
202 measuring unit
203 calculating unit
204 appearance setting unit
205 receiving unit
206 moving unit
207 deleting unit
208 output unit

BEST MODE FOR CARRYING OUT THE INVENTION

An embodiment of the present invention will now be described. While the following describes an embodiment in which the present invention is realized by using an information processing device for games for the ease of understanding, the following embodiment is given by way of illustration only, and does not limit the scope of the invention. Therefore, those skilled in the art can employ embodiments in which the individual elements or all the elements are replaced with equivalent ones, and such embodiments are also encompassed in the scope of the invention.

Embodiment 1

FIG. 1 is a schematic diagram illustrating a schematic configuration of a typical information processing device 100 that carries out a function of a game device of the present invention by executing a program. A description will be given hereinbelow referring to this diagram.

The information processing device 100 has a CPU (Central Processing Unit) 101, a ROM (Read Only Memory) 102, a RAM (Random Access Memory) 103, an interface 104, a controller 105, an external memory 106, a DVD-ROM (Digital Versatile Disk-Read Only Memory) drive 107, an image processor 108, a sound processor 109, and an NIC (Network Interface Card) 110.

As a DVD-ROM storing a program and data for a game is loaded into the DVD-ROM drive 107 and the information processing device 100 is powered on, the program is executed to realize the game device of this embodiment.

The CPU 101 controls the overall operation of the information processing device 100, and is connected to individual components to exchange control signals and data therewith. Further, by using an ALU (Arithmetic Logic Unit) (not shown), the CPU 101 can perform arithmetic operations such as addition, subtraction, multiplication, division, etc., logical operations such as logical addition, logical multiplication, logical negation, etc., bit operations such as bit addition, bit multiplication, bit inversion, bit shift, bit rotation, etc., on a storage area called a register (not shown) which can be accessed at a high speed. Further, the CPU 101 itself is designed to be able to rapidly perform saturate operations such as addition, subtraction, multiplication, division, etc., for handling multimedia processes, trigonometric function, etc., or vector operations, may realize these with a coprocessor.

An IPL (Initial Program Loader) which is executed immediately after power-on is recorded in the ROM 102. As the IPL is executed, the program recorded in the DVD-ROM is read into the RAM 103 and its execution by the CPU 101 is started. Further, the ROM 102 stores a program and various data for an operating system necessary for controlling the overall operation of the information processing device 100.

The RAM 103 is for temporarily storing data and programs, and retains the program and data read out from the DVD-ROM, and other data needed for progressing a game and chat communication. Further, the CPU 101 performs processes such as securing a variable area in the RAM 103 to work the ALU directly upon the value stored in the variable to perform operations, or once storing the value stored in the RAM 103 in the register, performing operations on the register, and writing back the operation result to the memory, etc.

The controller 105 connected via the interface 104 receives an operation input which is made when a user executes the game, such as a soccer game or card game.

The external memory 106 detachably connected via the interface 104 rewritably stores data indicating the play status (past performance, etc.) of a match-up game, etc., data indicating the progress status of the game, data of chat communication logs (records) in the case of a network match-up game, etc. As the user makes an instruction input via the controller 105, these data can adequately be recorded in the external memory 106.

The program for realizing the game and image data and sound data accompanying the game are recorded in the DVD-ROM to be loaded into the DVD-ROM drive 107. Under the control of the CPU 101, the DVD-ROM drive 107 performs a process of reading from the DVD-ROM loaded therein to read a necessary program and data, and these are temporarily stored in the RAM 103 or the like.

The image processor 108 processes data, which are read out from the DVD-ROM, by means of the CPU 101 and an image operation processor (not shown) the image processor 108 has, and then records the data in a frame memory (not shown) the image processor 108 has. The image information recorded in the frame memory is converted to a video signal at a predetermined synchronous timing, which is in turn output to a monitor (not shown) connected to the image processor 108. Thereby, image displays of various types are available.

The image operation processor can provide rapid execution of an overlay operation of a two-dimensional image, a transparent operation such as α blending, and various kinds of saturate operations.

It is also possible to provide rapid execution of an operation of rendering polygon information which is arranged in virtual three-dimensional space and to which various kinds of texture information are added, by a Z buffer scheme to acquire a rendered image in which a polygon arranged in the virtual three-dimensional space is viewed down from a predetermined view point position, in a predetermined direction of a line of sight.

Further, the CPU 101 and the image operation processor cooperate to be able to write a string of characters as a two-dimensional image in the frame memory or on each polygon surface according to font information which defines the shapes of characters.

Information such as images of match-up games or images of playing cards may be prepared on the DVD-ROM so as to enable display of the state of match or the card hand by being opened in frame memory.

The sound processor 109 converts sound data read out from the DVD-ROM to an analog sound signal, and controls a speaker to output the sound signal from a speaker (not shown) connected thereto. Under the control of the CPU 101, the sound processor 109 generates sound effects and music data to be generated during progress of the game, and outputs sound corresponding thereto from a speaker.

In a case where the sound data recorded on the DVD-ROM is MIDI data, the sound processor 109 refers to the sound source data included in the data, and converts the MIDI data to PCM data. Further, in a case where the sound data is compressed sound data of ADPCM (Adaptive Differential Pulse Code Modulation) format or Ogg Vorbis format, etc., the sound processor 109 expands the data, converting it to PCM data. The PCM data is D/A (Digital/Analog) converted at a timing corresponding to the sampling frequency of the data and output to the speaker, thereby enabling sound output.

The NIC 110 serves to connect the information processing device 100 to a computer communication network (not shown), such as the Internet. The NIC 109 includes those according to the 10 BASE-T/100 BASE-T standard which are used at the time of constructing a LAN (Local Area Network) or an analog modem for connecting to the Internet using a telephone line, an ISDN (Integrated Services Digital Network) modem, an ADSL (Asymmetric Digital Subscriber Line) modem, a cable modem for connecting to the Internet using a cable television circuit, or the like, and an interface (not shown) which intervenes between these modems and the CPU 101.

In addition, the information processing device 100 may be configured to achieve the same functions as the ROM 102, the RAM 103, the external memory 106, and a DVD-ROM or the like which is to be loaded into the DVD-ROM drive 107 by using a large-capacity external storage device, such as a hard disk.

Next, the processing performed by a game device 200 of the present embodiment will be described. The following description is given on the assumption that the game device 200 executes a match-up game between a player character object (hereinafter simply referred to as "player character") configured to move within a virtual space in accordance with player instructions, and an enemy character object (hereinafter simply referred to as "enemy character"). The enemy character is given operation instructions by the game device 200. The player character and enemy character are movable within this virtual space. Note, however, that the game content described herein is merely one example.

Figure 2:
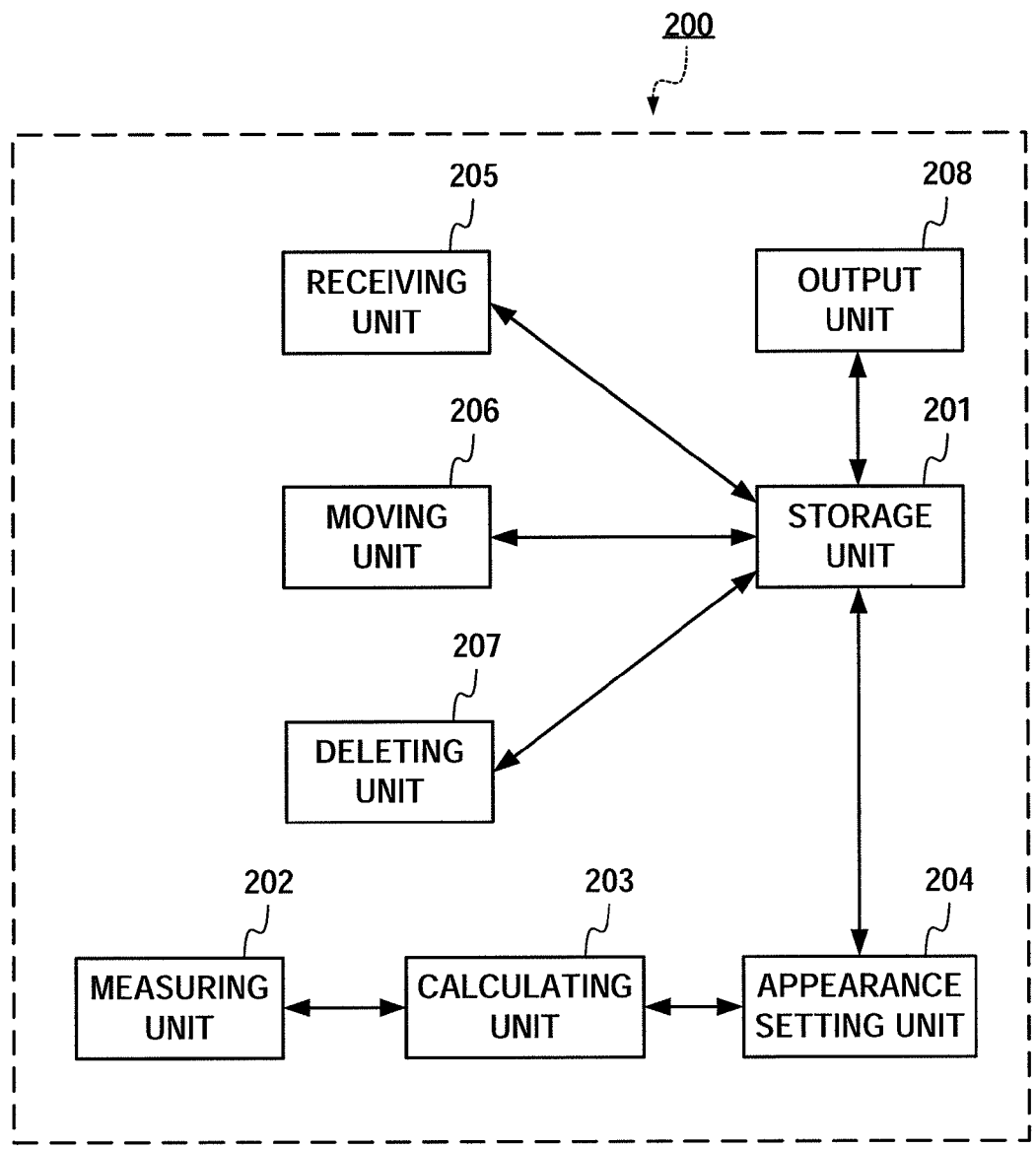
FIG. 2 A diagram for explaining the processing performed by each unit of the game device.

FIG. 2 is a diagram illustrating the configuration of the game device 200. The game device 200 comprises a storage unit 201, a measuring unit 202, a calculating unit 203, an appearance setting unit 204, a receiving unit 205, a moving unit 206, a deleting unit 207, and an output unit 208.

The storage unit 201 stores (1) a position of the player character within the virtual space, (2) a position of the enemy character, and (3) candidate positions for enemy character appearance. Each of these positions is expressed as space coordinate values based on a coordinate system set within the virtual space, for example. It can be determined in any way which coordinate system to use. For example, an orthogonal coordinate system based on three mutually orthogonal axes may be used, or a polar coordinate system such as a system with spherical coordinates based on one moving radius and two deflection angles may be used. The storage unit 201 stores these pieces of information in a predetermined storage area within the RAM 103. The configuration may also be designed so that the information is stored in the external memory 106.

The player operates the controller 105 so as to give instructions to the player character, making the player character move or fight the enemy character. If, for example, the player character attacks the enemy character and the damage level (so-called "damage") from that attack or the total damage of the enemy character is greater than or equal to a predetermined value, the enemy character is brought down and the player character wins. The enemy character may also cease to exist (disappear from within the virtual space) regardless of the attacks from the player character, when a predetermined period of time has elapsed from the time the enemy character first appeared. The game device 200 suitably causes an enemy character to appear according to the development of the game. For example, the game device 200 produces a new enemy character within the virtual space when an enemy character is brought down or ceases to exist. The new position at which the enemy character appears is selected from the candidates stored in the storage unit 201 by the appearance setting unit 204 described later. The selection method will be described in detail later. Also, note that, in the following description, "the player character brings down the enemy character" means "the player character defeats the enemy character".

FIG. 3A shows an example of the structure of data indicating the position of the player character and stored in the storage unit 201, and FIG. 3B is an example of the structure of data indicating the positions of the enemy characters. The positions of the enemy characters are stored in an amount equivalent to the number of enemy characters that exist within the virtual space. The identification information is information for identifying the type and individual unit of the enemy character. This information is expressed, for example, using numbers, letters, or symbols. While there is one game player and one player character in this embodiment, a plurality of players may participate and a plurality of player characters may exist. In such a case, the storage unit 201 may store, as information indicating the position of the player character, the identification information for identifying a player character and the information of the position of the player character so that they are associated with each other. The following description refers to the combination of the identification information of the enemy character and the position of the enemy character as a "record."

FIG. 3C shows an example of the structure of data stored in the storage unit 201 and indicating the candidate positions for enemy character appearance. The identification information, similar to that of FIG. 3B, is information for identifying the type and individual unit of the enemy character. A candidate list indicates the candidates for appearance positions in the case where an enemy character will be newly caused to appear. The list is not limited to one candidate, but may include a plurality of candidates. These candidates are preset. For example, in this figure, for the enemy character identified in identification information "0001", the coordinate values (X1, Y1, Z1) are set as the first candidate and the coordinate values (X2, Y2, Z2) are set as the second candidate of the position where the enemy character will be newly caused to appear. When N number of candidates (where N is an integer of 1 or greater) exist in this manner, the appearance setting unit 204 selects any one candidate from the N number of candidates and updates the position of the enemy character stored in the storage unit 201 so as to position the enemy character at that position. Instead of using coordinate values, each of the candidate positions may be specified based on which area of a plurality of predetermined areas such as "Area 1" and "Area 2" the position is affiliated. In such a case, any one of the positions within the selected area becomes the position of appearance of the new enemy character. Note that FIGS. 3A, 3B, and 3C are merely examples. The information in these figures may be included in part only, or other information may be stored in addition to that information.

Furthermore, the CPU 101 and the RAM 103 work in cooperation to function as the storage unit 201.

The measuring unit 202 measures the elapsed time from the moment the game is started to the present, and stores the measured elapsed time to a predetermined storage area of the RAM 103. The measuring unit 202 measures the elapsed time using an internal clock (not shown) provided in the game device 200. The measuring unit 202 may obtain the elapsed time by measuring the correct time in units of hours, minutes, or seconds, for example, or by counting the number of times of periodic interrupt processing, such as monitor vertical synchronizing interrupt processing (generally a sixtieth second) and regarding the counted number as the elapsed time. Further, the measuring unit 202 can also measure the elapsed time from any given timing within the game to the present.

Furthermore, the CPU 101 functions as the measuring unit 202.

While in the present embodiment the measuring unit 202 acquires the elapsed time from the moment the game is started, the elapsed time from any given timing within the game may be obtained. For example, in a case where the game comprises a plurality of stages or scenes according to the degree of progress of a scenario, the elapsed time from the start of each stage or scene may be used. The measuring unit 202 resets and starts measuring the elapsed time once again on a per stage or scene basis. Further, the elapsed time from the moment a predetermined event occurs within the game to the present may also be measured, when such event occurs.

The calculating unit 203 calculates a distance that increases as the elapsed time measured by the measuring unit 202 increases (hereinafter referred to as "reference distance"). This reference distance is used to determine the position at which the appearance setting unit 204 is to newly cause the enemy character to appear. The unit employed is arbitrary. Typically, the distance between two points based on a unit length determined in the coordinate system set within the virtual space where the game is played (the distance between the position coordinates of the player character and the position coordinates of the enemy character) is used.

Figure 4:
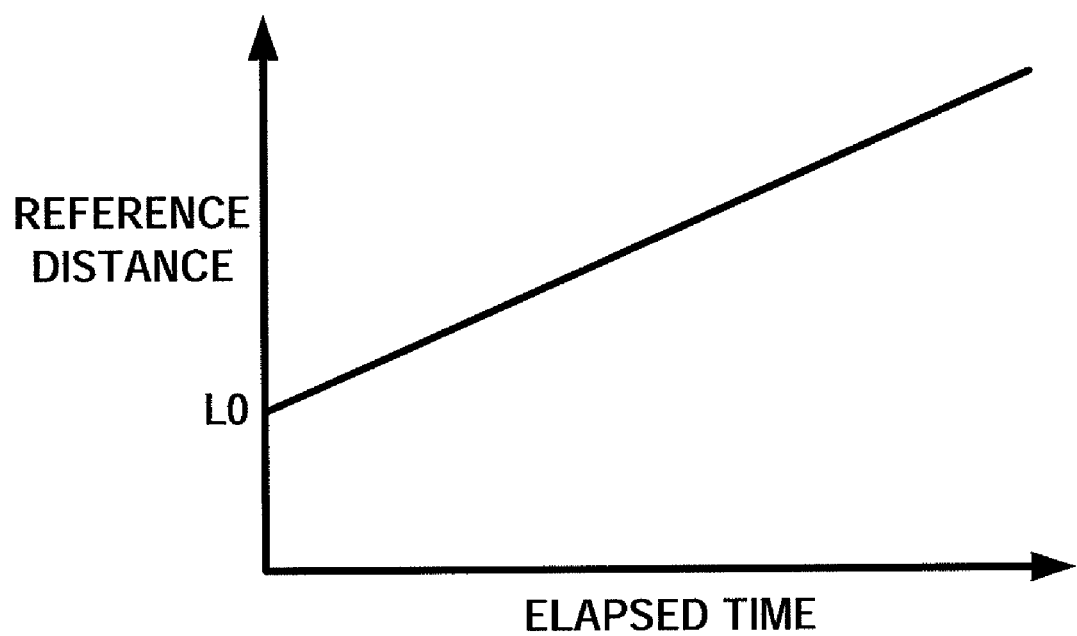
FIG. 4 A diagram illustrating an example of a relationship between elapsed game time and the reference distance for obtaining the appearance position of a new enemy character.

The reference distance increases as the elapsed time from the moment of the game start increases. That is, the reference distance monotonically increases with respect to the elapsed game time as shown in FIG. 4, for example. In this figure, this relationship is drawn as a linear function, but the relationship is not limited thereto and may be any curving function. The reference distance may also be expressed as a non-continuous function such as a stepped function. Or the relationship may be expressed using a table that store a plurality of reference distances in association with the elapsed time. In such a case, the calculating unit 203 may perform spline interpolation between each point so as to uniquely obtain the reference distance for an arbitrary elapsed time. Any method can be used for the interpolation.

Furthermore, the CPU 101 functions as the calculating unit 203.

The appearance setting unit 204 stores, from among the candidate positions for enemy character appearance stored in the storage unit 201, the candidate position whose distance from the position of the player character stored in the storage unit 201 is the closest to the reference distance calculated by the calculating unit 203, to the storage unit 201 as the position of the new enemy character.

Furthermore, the CPU 101 and the RAM 103 work in cooperation to function as the appearance setting unit 204.

Figure 5:
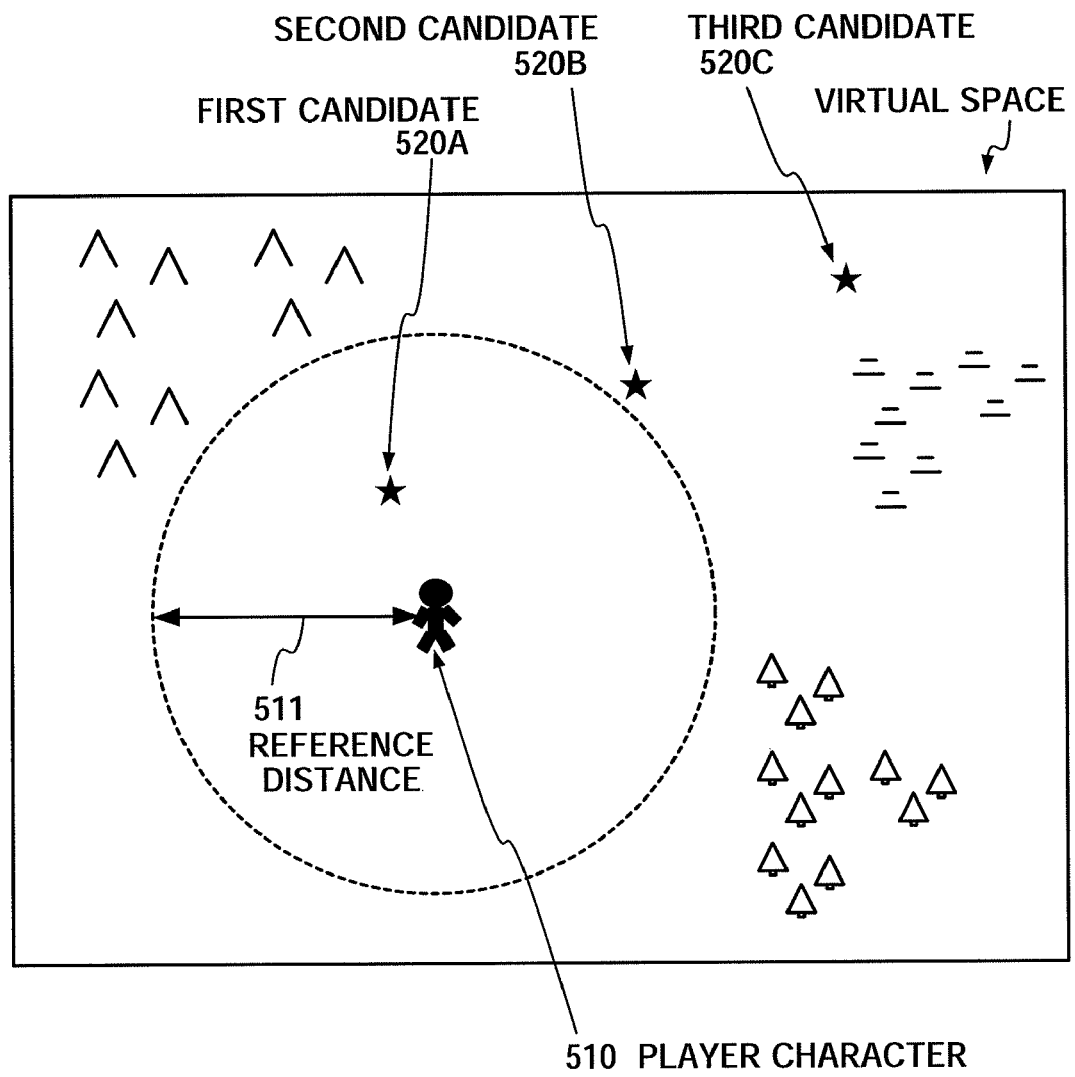
FIG. 5 A diagram illustrating an example of a relationship between the reference distance and the candidate positions for new enemy character appearance.

FIG. 5 is a diagram illustrating an example of a relationship between a reference distance 511 from a player character 510 and a candidate position 520 for new enemy character appearance. Each of the stars shown in this figure indicates one candidate 520 of a position at which the enemy character may be newly caused to appear, and in this example the three candidates 520A, 520B, and 520C are indicated. That is, the storage unit 201 stores a candidate list that includes the first to third candidates 520A, 520B, and 520C as the candidates 520 of a position where the enemy character may be newly caused to appear.

First, the measuring unit 202 measures the elapsed time from the moment of the game start to the present. The calculating unit 203 then obtains the reference distance 511 corresponding to the measured elapsed time. The dashed curve shown in this figure is a circle having a radius of the obtained reference distance 511. Then, the appearance setting unit 204 selects from among the candidates for enemy character appearance the candidate 520 closest to the reference distance 511, that is, the candidate 520 that is closest to the arc of this circle, establishing that candidate as the new enemy character position. In this example, the appearance setting unit 204 sets the second candidate 520B as the position of the new enemy character.

While in this example, the virtual space is expressed using two dimensions so as to make the present invention easier to understand, the virtual space may be a three-dimensional space. In the case of three dimensions, a sphere may be used instead of a circle. While in this figure the positions of the candidates 520 are indicated by stars and the circle showing the reference distance 511 is indicated by a dashed curve, the stars and dashed curve are merely for the purpose of giving explanation and do not appear on the actual game screen. This figure is merely one example; the screen layout, the positions of the candidates 520, the number of candidates 520, etc., may be arbitrarily changed.

The receiving unit 205 acquires the position of the player character and stores it to the storage unit 201. For example, the receiving unit 205 receives instruction input inputted by the user using the controller 105, obtains the position of the player character, and stores the obtained position of the player character to the storage unit 201. The player can make an instruction to move the player character in any direction using the controller 105. Note, however, that the player character sometimes cannot move as instructed when a non-moving fixed object (a rock, tree, or building, for example) exists in the instructed direction.

Furthermore, the CPU 101, the RAM 103, and the controller 105 work in cooperation to function as the appearance setting unit 204.

The moving unit 206 moves the position of the enemy character. That is, the moving unit 206 updates the position of the enemy character stored to the storage unit 201. The moving unit 206 updates the position of the enemy character that changes according to game development at a periodic timing, such as the timing of the monitor vertical synchronizing interrupt, for example.

Furthermore, the CPU 101 and the RAM 103 work in cooperation to function as the moving unit 206.

The deleting unit 207 deletes the record associated with an enemy character from the storage unit 201 when the player character brings down that enemy character or the enemy character ceases to exist. As a result, the fallen enemy character is deleted from the game.

Here, when the player character brings down the enemy character, the deleting unit 207 may correspondingly store a flag indicating that the enemy character has been brought down at the position, stored in the storage unit 201, of the enemy character. When the enemy character is caused to appear, the appearance setting unit 204 stores a flag indicating that the enemy character is alive at the position of the enemy character (the player character has not yet brought the enemy character down). The output unit 208 refers to this flag, determines whether or not the enemy character is to be displayed on the game screen, and outputs (or does not output) the enemy character. Or, the output unit 208 determines whether an image of a living character or an image of deceased character is to be displayed and then outputs the image of the enemy character accordingly.

Furthermore, the CPU 101 and the RAM 103 work in cooperation to function as the deleting unit 207.

The output unit 208 reads out the positions of the player character and enemy character, which are stored in the storage unit 201, and outputs the images of the player character and enemy character in those positions. When the positions of the player character and enemy character are set in the storage unit 201, the CPU 101 reads out an image data of the player character from the DVD-ROM loaded to the DVD-ROM drive 107 and controls the image processor 108 so as to output the image of the player character at the position of the player character stored in the storage unit 201. Similarly, the CPU 101 reads out the image data of the enemy character from the DVD-ROM loaded to the DVD-ROM drive 107, and controls the image processor 108 so as to output the image of the enemy character at the position, stored in the storage unit 201, of the enemy character. The CPU 101 also reads out data such as the image data of other character objects and text data in the game so as to generate a game screen in accordance with a predetermined game program stored in the DVD-ROM and outputs it on a monitor connected to the image processor 108. As a result, the user can play the game by operating the controller 105 while viewing the screen. While the image data, such as those of the player character and enemy character, is typically expressed as numeric data obtained by dividing the surface into minute multi-angular polygons (typically triangles, rectangles, etc.), and the data may be one of another format such as bitmap data, and no limit is made by the present invention.

Furthermore, the CPU 101, the RAM 103, and the image processor 108 work in cooperation to function as the output unit 208.

(Appearance Setting Processing)

Figure 6:
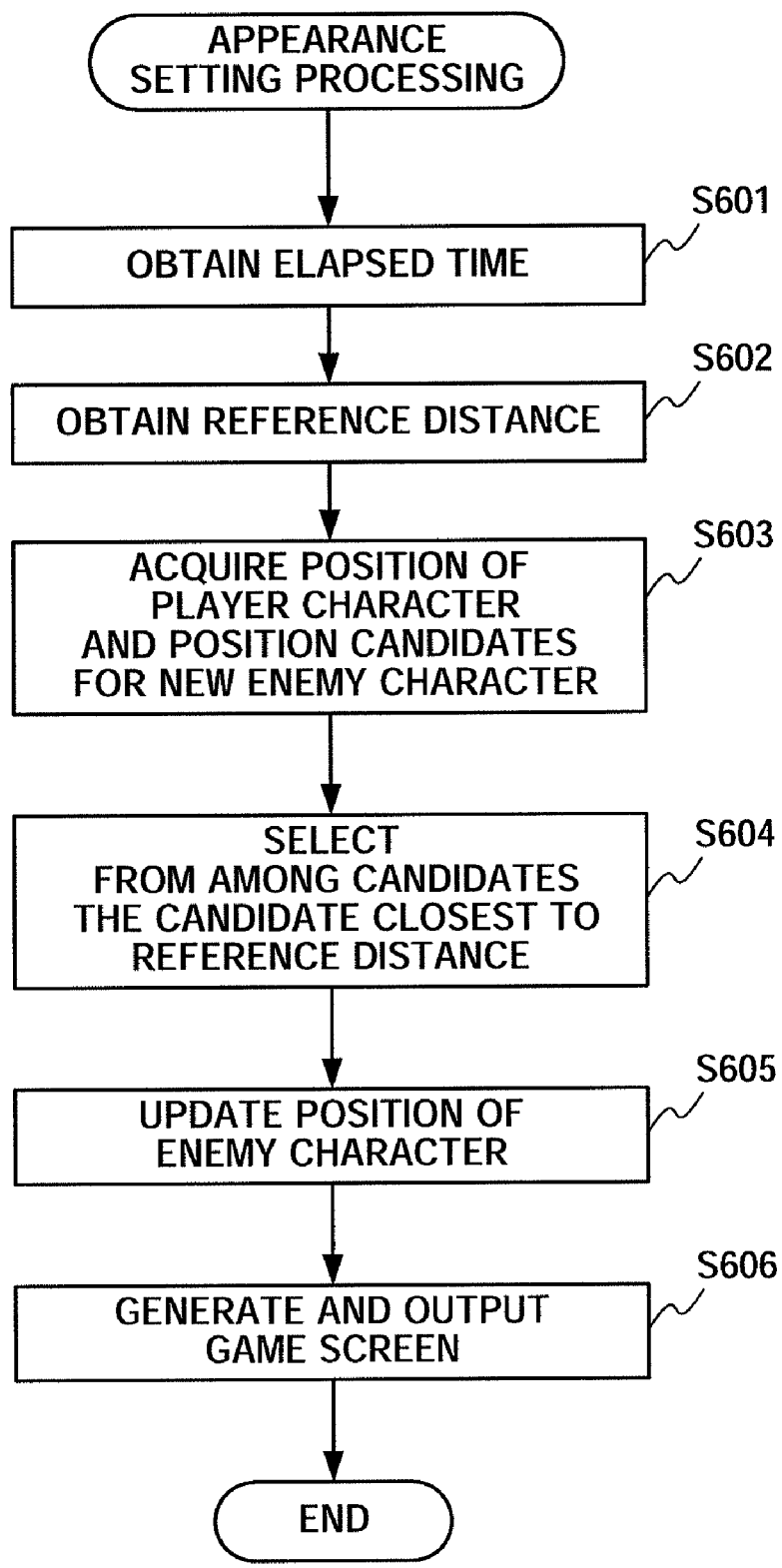
FIG. 6 A flowchart for explaining the appearance setting processing performed by the game device.

The appearance setting processing performed by each unit of the game device 200 of the present embodiment will now be described with reference to the flowchart shown in FIG. 6. The appearance setting processing is performed when the game device 200 is to cause a new enemy character to appear. The following describes, an illustrative scenario of the appearance setting processing performed in a match-up game at the time the game device 200 determines to cause a new enemy character to appear after a player character operated by a player using the controller 105 has damaged and brought down an enemy character. Note, however, that this is merely an example, and the game device 200 may perform the appearance setting processing at any timing.

The receiving unit 205 receives an instruction input for moving the player character in a specified direction, as instruction input, for making the player character perform a specific operation (for example, to mount a sword or shield on the player character, etc.), and for other game related operations from the controller 105 operated by the user. The receiving unit 205 stores the data indicating the position of the player character to the storage unit 201 in accordance with these instruction inputs. The receiving unit 205 executes this processing at predetermined periodic timing, such as the timing of the monitor vertical synchronizing interrupt. With this arrangement, the latest position of the player character is stored in the storage unit 201.

The moving unit 206 executes the process of updating the position of the enemy character that changes according to game development at predetermined periodic timing, such as the timing of the monitor vertical synchronizing interrupt, for example. With this arrangement, the latest position of the enemy character is stored to the storage unit 201.

First, the measuring unit 202 obtains the elapsed time from the moment of the game start (step S601). For example, the measuring unit 202 stores the time the game started and the present time in a predetermined storage area of the RAM 103, and obtains the elapsed time from the difference of these times.

The calculating unit 203 obtains from the elapsed time obtained in step S601 the above-described reference distance used for determining the position at which the new enemy character is to be outputted (step S602). For example, the calculating unit 203 obtains the reference distance using a function for expressing a relationship between elapsed time and reference distance, such as that shown in FIG. 4.

The appearance setting unit 204 acquires the current position of the player character and the candidate position where the new enemy character is to be outputted from the storage unit 201 (step S603). In a case where there are a plurality of candidate positions, all positions are acquired.

Furthermore, the appearance setting unit 204 selects from among the candidates acquired in step S603, the one that is closest to the reference distance acquired in step S602 (step S604). The candidate selected here is the position where the new enemy character is to be outputted.

Then, the appearance setting unit 204 updates the storage unit 201 so that the position of the candidate selected in step S604 will be the output position of the new enemy character (step S605). Specifically, for example, a new record indicating the combination of the identification information of the enemy character to be newly caused to appear and the position of the enemy character to be newly caused to appear is added to the data shown in FIG. 3B.

The output unit 208 acquires the position of the player character and the position of the enemy character, which are stored in the storage unit 201, and generates a game screen in which the respective characters are arranged and outputs it (step S606).

In the present embodiment the appearance setting unit 204 selects from among the candidates stored in the storage unit 201 the one closest to the reference distance and determines it as the appearance position of the new enemy character. However, the appearance setting unit 204 may select a candidate from among those candidates positioned farther away than the reference distance. For example, the appearance setting unit 204 may select at random a candidate from among the candidates that are at least the reference distance away, in a case where there are a plurality of candidates in positions farther away than the reference distance. The appearance setting unit 204 may execute a weighted random selection in such a manner that the larger the difference from the reference distance is, the smaller the probability of selection is.

For example, in general, beginner players often require a longer time than an advanced player to bring down an enemy character. If the position in which the enemy character appears is determined completely at random or always set to a fixed position, a new enemy character may appear very close to the player character once again immediately after the player character takes down an enemy character. When this happens, there is the possibility that a beginner player will feel that the game is very difficult, feel the sense of unfairness, and loose interest because of the excessive difficulty. However, according to the present invention, the position at which the enemy character newly appears is at a distance from the player character that increases as the time until the enemy character is brought down increases, thereby eliminating the perception that the game is unreasonably difficult for a beginner player.

Further, in general, advanced players often take a shorter time than a beginner player to take down an enemy character. If a new enemy character always appears in a location far away from the player character after the player takes down an enemy character, there is the possibility that the advanced player will feel that the game is very easy, find the game boring, and loose interest in the game. However, according to the present invention, the position at which the enemy character newly appears is at a distance such that the longer the time required to bring down the enemy character is, the farther from the player the enemy character appears, and any dissatisfaction felt by an advanced player can be eliminated.

According to the present embodiment, the game device 200 causes a next new enemy character to appear near the player character when an enemy character is brought down immediately after a game starts, and causes the next new enemy character to appear far from the player character when an enemy character is brought down some time after the game starts. With this arrangement, the enemy character never continually appears in positions close to the player character, which would unreasonably increase the degree of game difficulty level.

Note that an enemy character whose appearance position is controlled by the above-described appearance setting unit 204 and an enemy character that is not controlled in this manner may coexist within the game.

In this way, when causing a new enemy character to appear, the game device 200 changes the position at which the new enemy character appears according to the elapsed game time, making it possible to ensure that the game is not too difficult or too easy. For example, regardless if the player is a beginner player or an advanced player, the game device 200 causes the enemy character to appear in such a manner as not to greatly disrupt the game balance, thereby making the game interesting.

Embodiment 2

Figure 7:
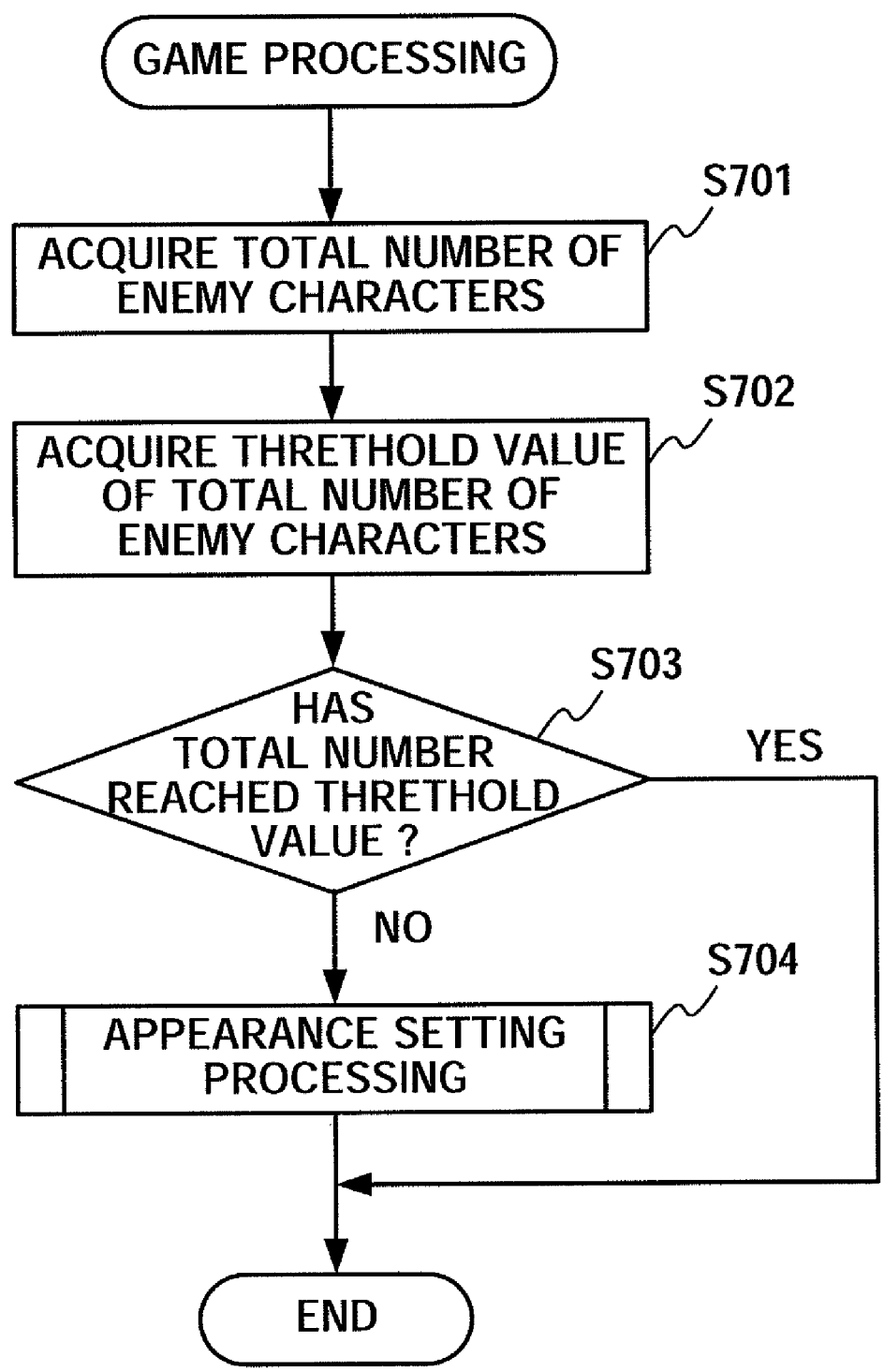
FIG. 7 A flowchart for explaining the processing performed by the game device in embodiment 2.

Next, another embodiment of the present invention will be described with reference to the flowchart shown in FIG. 7. The present embodiment differs from the above embodiment in the respect that the total number of enemy characters that appear in the game does not increase above a predetermined number. Note that the components common to the above embodiment are denoted by the same reference numerals, and descriptions therefor will be omitted.

The storage unit 201 further stores a threshold value (upper limit) of the total number of enemy characters that can simultaneously appear in the game. The threshold value is stored in advance in the game program stored in the DVD-ROM, and the CPU 101 reads out and stores the value in the storage unit 201 when the game is started. For example, the threshold value is predetermined per game stage and per scene. A single common upper value may also be set for the entire game.

First, the appearance setting unit 204 acquires the total number of enemy characters that already exist in the game (step S701). The appearance setting unit 204 acquires the total number by counting the number of records of data indicating the positions of enemy characters that are stored in the storage unit 201.

The appearance setting unit 204 acquires from the storage unit 201 the threshold value of the total number of enemy characters that appear in the game (step S702).

The appearance setting unit 204 determines whether or not the total number of enemy characters acquired in step S701 has reached the threshold value acquired in step S702 (step S703).

In a case where the decision has been made that the threshold value has not been reached (step S703: NO), the game device 200 executes the above-described appearance setting processing shown in FIG. 6 (step S704). On the other hand, if the decision is made that the threshold value has been reached (step S703: YES), the game device 200 ends the processing. The appearance setting processing performed in step S704 is the same as the processing described in the above embodiment, and a description therefor will be omitted.

The deleting unit 207 deletes the data indicating the position of the enemy character from the storage unit 201 in a case where the player character damages the enemy character to a predetermined level or higher, or in a case where a predetermined length of time until the enemy character naturally expires has elapsed, for example. As a result, the output unit 208 can make the enemy character disappear from the game screen.

In this manner, according to the present embodiment, the game device 200 controls the total number of enemy characters that presently exists in the game so that the number does not exceed a predetermined threshold value. That is, when a new enemy character is to be caused to appear, the game device 200 changes the position where the enemy character is to appear according to the elapsed game time and causes the enemy character to appear if the total number of enemy characters has not reached the threshold value, thereby making it possible to ensure that the game is not too difficult. For example, regardless if the player is a beginner player or an advanced player, the game device 200 causes the enemy character to appear in such a manner as not to greatly disrupt the game balance, thereby making the game interesting.

Embodiment 3

Figure 8:
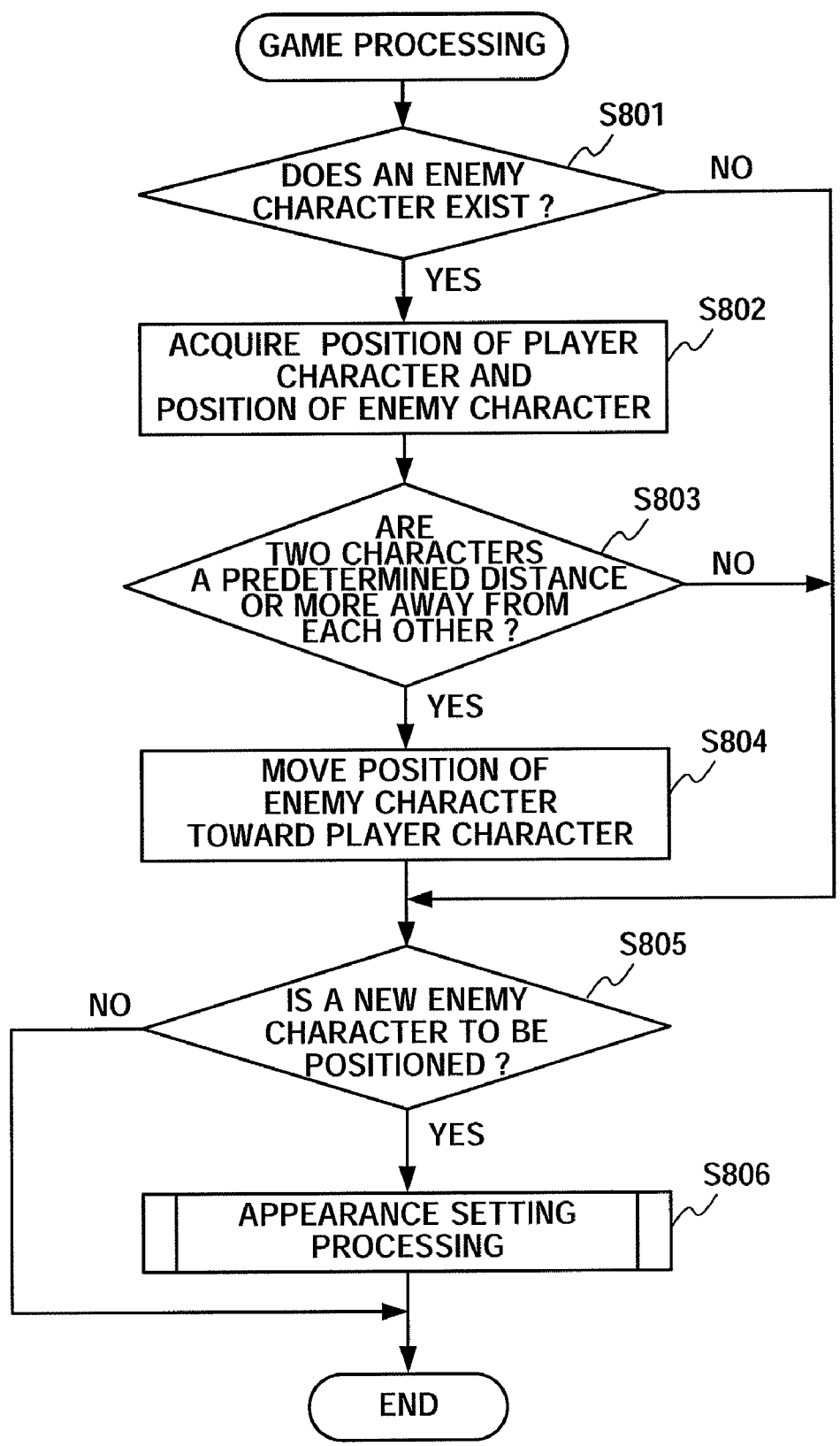
FIG. 8 A flowchart for explaining the processing performed by the game device in embodiment 3.
Figure 9:
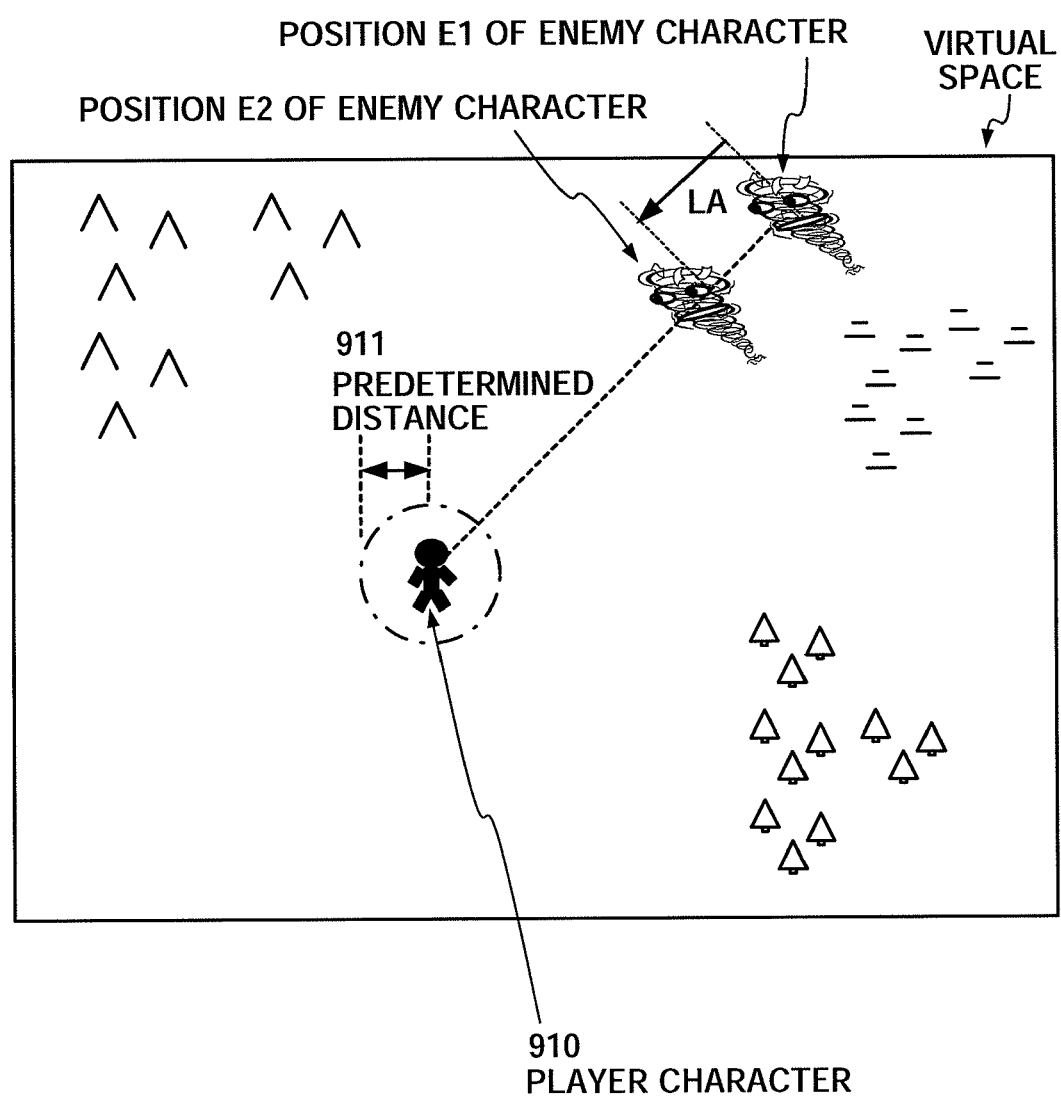
FIG. 9 A diagram illustrating an example of positions to which the enemy character is moved.

Next, another embodiment of the present invention will be described with reference to the flowcharts shown in FIG. 8, and to FIG. 9. The present embodiment differs from the above embodiment in the respect that the enemy characters in the game are controlled so that they come closer to the location of the player character. Furthermore, the components common to the above embodiment are denoted by the same reference numerals, and descriptions therefor will be omitted.

First, the moving unit 206 determines whether or not an enemy character exists within the game presently in progress (step S801). The moving unit 206 counts the number of records of data indicating a position of an enemy character, which are stored in the storage unit 201, and determines that enemy characters exist if the number of records is one or greater, or that enemy characters do not exist if the number is any other number.

In a case where it is determined that enemy characters do not exist (step S801: NO), the appearance setting unit 204 performs the processing from step S805 down that is described later.

On the other hand, in a case where it is determined that an enemy character does exist (step S801: YES), the moving unit 206 acquires the current position of the player character and the position of the enemy character (step S802). In a case where there are a plurality of enemy characters, the moving unit 206 acquires all the positions of the enemy characters.

Further, the moving unit 206 determines whether or not the player character and the enemy character are a predetermined distance or more away from each other (step S803). For example, as shown in FIG. 9, a predetermined distance 911 is given as a sufficient distance for ensuring that the player character and enemy character do not overlap when the output unit 208 outputs a game image. The predetermined distance 911 is stored in advance in the game program stored in the DVD-ROM, and the CPU 101 reads out and stores the value in the storage unit 201 when the game is started.

In a case where it is determined that the two are not the predetermined distance 911 or more away from each other (step S803: NO), the game device 200 proceeds to the processing of step S805 described later. Furthermore, in such a case, the moving unit 206 may change the position of the enemy character so that the player character and enemy character are the predetermined distance 911 or more away from each other, and store that position in the storage unit 201.

In a case where it is determined that the two are the predetermined distance 911 or more away from each other (step S803: YES), the moving unit 206 moves the position of the enemy character so that the enemy character comes closer to the position of the player character (step S804), and stores the position after the move in the storage unit 201. For example, as shown in FIG. 9, when the enemy character exists at position E1 at a certain time, the moving unit 206 moves the enemy character by a distance of LA per unit of time, to position E2, bringing the enemy character closer to a player character 910, obtains the position coordinates of the enemy character after the move and stores it in the storage unit 201. The unit of time is, for example, a time interval based on the count of monitor vertical synchronizing interrupts. The distance LA moved per unit of time can be set to different values depending on the type and individual unit of the enemy character. This distance LA corresponds to the moving speed set per enemy character, and is calculated when the CPU 101 runs the game program and advances the game. The distance LA may be a fixed value, or may result in no movement at all (LA=0), depending on the enemy character. In a case where there are a plurality of enemy characters, the moving unit 206 performs processing configured to move the positions of all enemy characters, based on the positions acquired in step S802.

Further, the appearance setting unit 204 determines whether or not a new enemy character is to be positioned within the virtual space (step S805). For example, the appearance setting unit 204 performs the processing of step S701 to step S703 of the above embodiment so as to make the determination. That is, the appearance setting unit 204 makes the determination by acquiring the present total number of enemy characters (step S701), acquiring the threshold value (upper limit) in the number of the enemy characters that can be positioned (step S702), and determines whether or not the total number exceeds the threshold value (step S703).

In a case where it is determined that a new enemy character is to be positioned (step S805: YES), the appearance setting unit 204 performs the above-described appearance setting processing (step S806). On the other hand, in a case where it is determined that a new enemy character is not to be positioned (step S805: NO), the game device 200 ends the processing of moving the position of the enemy character. When an enemy character is newly positioned in step S805, the newly positioned enemy character is subject to movement the next time this processing is performed.

In this manner, according to the present embodiment, the game device 200 moves the enemy character that exists within the game toward the position of the player character, making it possible to ensure that the game is not too easy for the player. For example, even for an advanced player of the game, the game device 200 causes the enemy character to appear in such a manner as not to greatly disrupt the game balance, thereby making the game interesting.

Embodiment 4

The following describes another embodiment of the present invention. The present embodiment differs from the above embodiment in the respect that the present embodiment takes into consideration how a candidate is selected from among new enemy character candidates in a case where there are a plurality of candidates at distance away from the player character that is equivalent to the reference distance. Furthermore, the components common to the above embodiment are denoted by the same reference numerals, and descriptions therefor will be omitted.

Figure 10:
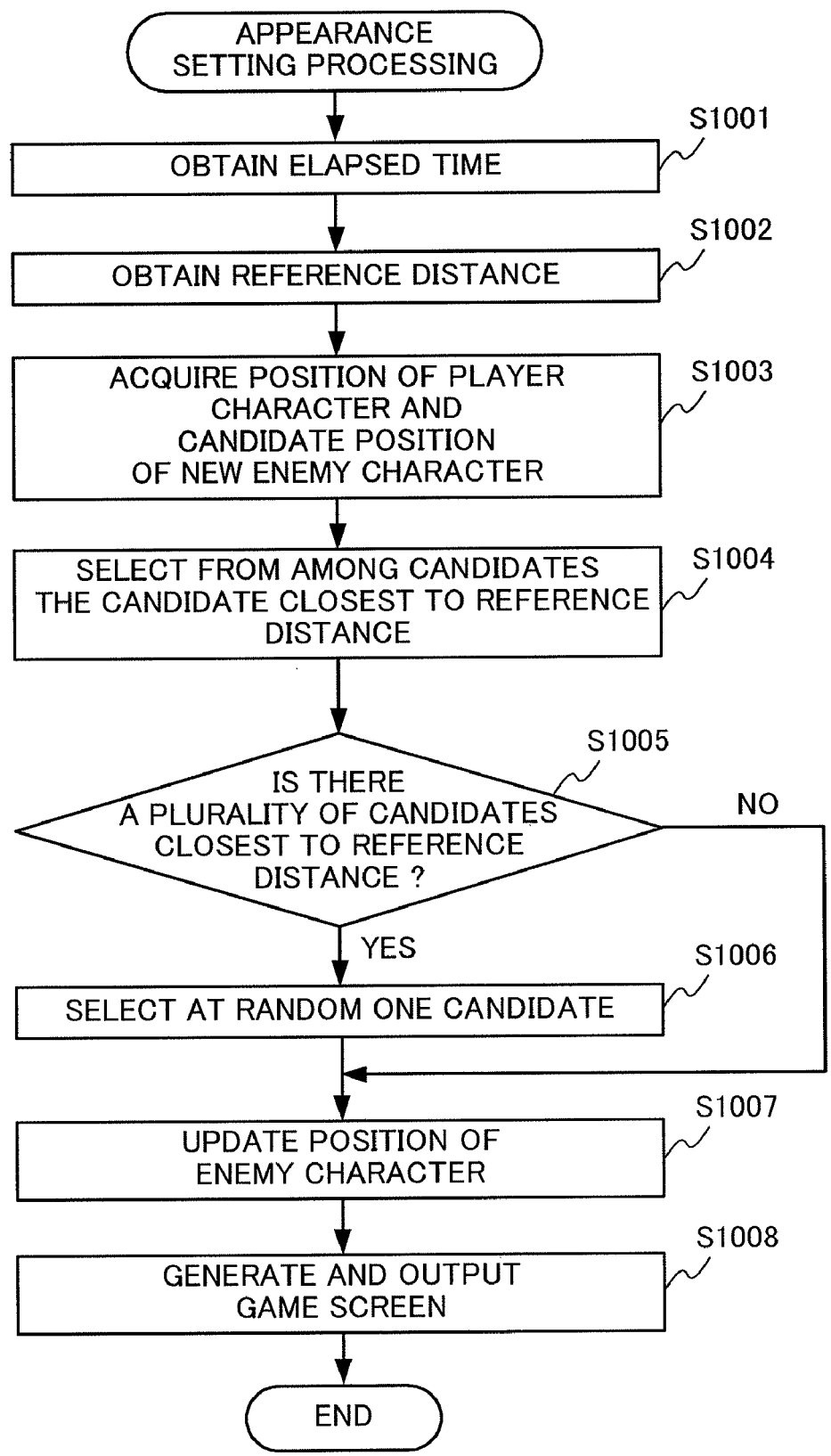
FIG. 10 A flowchart for explaining the appearance setting processing performed by the game device in embodiment 4.

FIG. 10 is a flowchart for explaining the appearance setting processing performed by the game device 200 in the present embodiment.

Figure 11A:
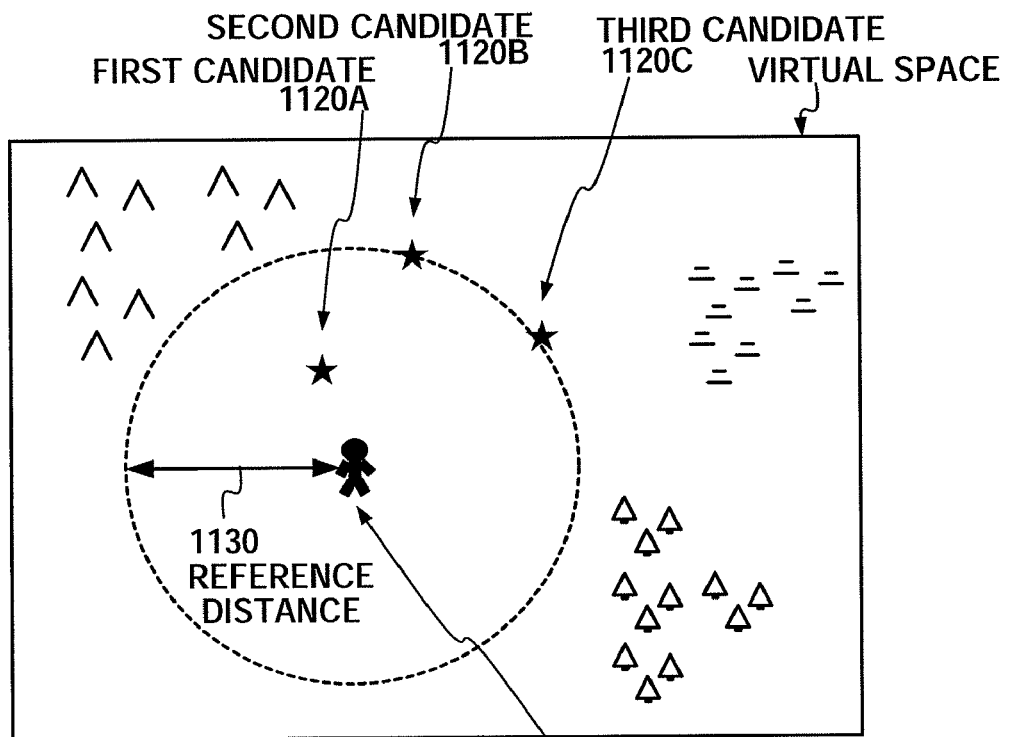
FIG. 11A A diagram illustrating an example of a relationship between the reference distance and the candidate positions for new enemy character appearance.
Figure 11B:
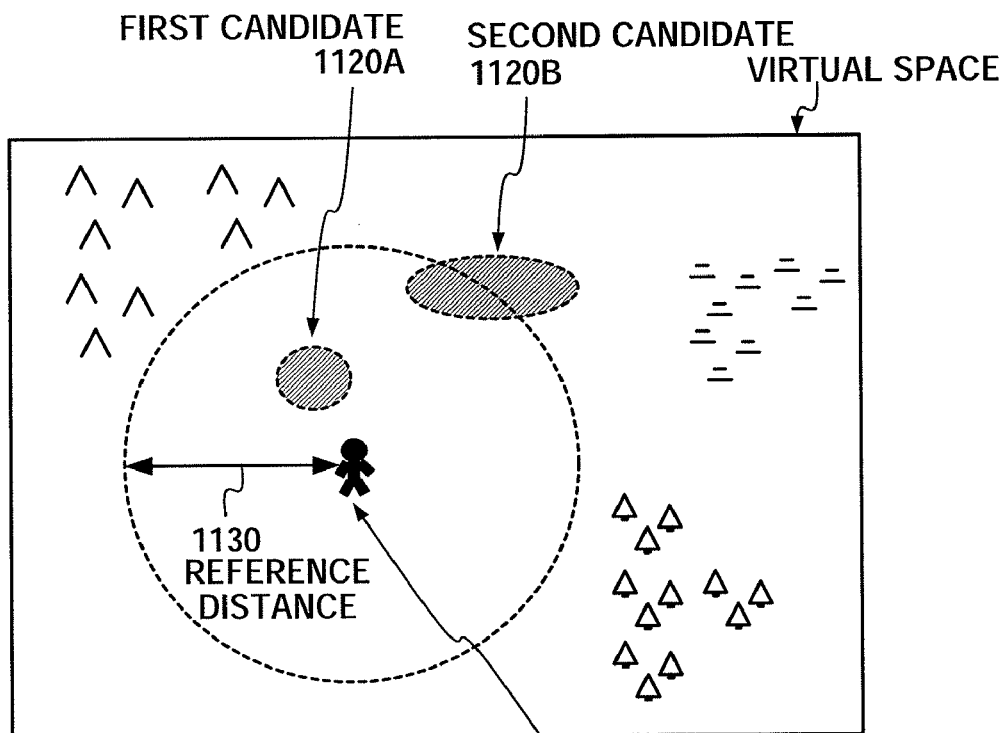
FIG. 11B A diagram illustrating another example of a relationship between the reference distance and the position candidates for new enemy character appearance.

FIGS. 11A and 11B are diagrams illustrating an example of a relationship between a reference distance 1130 from a player character 1110 and a candidate position 1120 (1120A, 1120B, and 1120C in the figure) for new enemy character appearance. While in this figure the positions of the candidates 1120 are indicated by stars and the circle showing the reference distance 1130 is indicated by a dashed curve, the stars and dashed curve are merely for ease of explanation and do not appear on the actual game screen. Note that these figures merely show one example.

While the storage unit 201 stores the candidate 1120 of the position for enemy character appearance as described above, a plurality of candidates 1120 may be set. As a result, among the candidates 1120 of the position for enemy character appearance that are stored in the storage unit 201, there may be a plurality of candidates 1120 whose distance from the position of the player character 1110 stored in the storage unit 201 are closest to the reference distance 1130 calculated by the calculating unit 203. For example, in FIG. 11A, two candidates, the second candidate 1120B and the third candidate 1120C, are candidates closest to the reference distance 1130. Further, the candidate 1120 of the position for enemy character appearance may be specified as an area rather than as coordinates. For example, in FIG. 11B, of the area of the first candidate 1120A and the area of the second candidate 1120B, there are, in the area of the second candidate 1120B, countless points of the reference distance 1130 calculated by the calculating unit 203. That is, the points on the arc of the circle showing the reference distance 1130 that overlap with the second area 1120B are all possible candidate positions for enemy character appearance.

In such a case, the appearance setting unit 204 randomly selects one candidate from this plurality of candidates 1120, and stores the selected candidate position as the new enemy character position in the storage unit 201. For example, in the case of FIG. 11A, the appearance setting unit 204 selects at random either the second candidate 1120B or the third candidate 1120C. For example, in the case of FIG. 11B, the appearance setting unit 204 randomly selects one point from the points on the arc that overlaps with the second area 1120B.

Furthermore, in a case where there are a plurality of the candidates stored in the storage unit 201 whose distances to the position of the player character are closest to the reference distance, the appearance setting unit 204 may set at random a bias (weight) to the probability of candidate selection, and randomly select a candidate accordingly. For example, a candidate set in a wooded area is given greater weight than a candidate set in a meadow area, thereby making it more likely that the candidate in the wooded area is selected if the distances are the same. That is, the larger weight a candidate is given, the more likely an enemy character appears there.

Further, a priority level may be set in advance for each candidate position for enemy character appearance, and the appearance setting unit 204 may select a candidate based on priority level. For example, the storage unit 201 may store the priority levels comprising a predetermined number of levels in association with candidate positions for enemy character appearance. Then, in a case where there are a plurality of characters having distances closest to the reference distance, the appearance setting unit 204 selects the candidate having the highest set priority level.

Next, the appearance setting processing of the present embodiment will be described with reference to FIG. 10. In this figure, the processing from step S1001 to step S1004 is the same as above steps S601 to S604, respectively, and a description therefor will be omitted.

In step S1005, the appearance setting unit 204 determines whether or not there are a plurality of candidates closest to the reference distance selected in step S1004.

In a case where it is determined that the number is plural (step S1005: YES), the appearance setting unit 204 selects at random one candidate from these candidates (step S1006). The appearance setting unit 204 may also randomly select a candidate after applying weight to the selection probability of each candidate or after setting a priority level for each candidate. Then, the appearance setting unit 204 updates the storage unit 201 so that the position of the candidate selected will be the output position of the new enemy character (step S1007). The output unit 208 acquires the position of the player character and the position of the enemy character, which are stored in the storage unit 201, and generates a game screen in which the respective characters are arranged (step S1008) and outputs it.

On the other hand, in a case where it is determined that the number is not plural (step S1005: NO), the appearance setting unit 204 updates the storage unit 201 so that the position of the candidate selected in step S1004 will be the output position of the new enemy character (step S1007), and the output unit 208 generates a game screen in which the respective characters are arranged and outputs it (step S1008).

In this manner, according to the present embodiment, even if there are a plurality of candidates at a distance, equivalent to the reference distance, away, the game device 200 can appropriately select one candidate so as to cause an enemy character to appear, thereby ensuring that the game is not too difficult or too easy for the user. For example, regardless if the player is a beginner player or an advanced player, the game device 200 causes the enemy character to appear in such a manner as not to greatly disrupt the game balance, thereby making the game interesting.

Embodiment 5

The following describes another embodiment of the present invention. The present embodiment is that wherein the method of selection upon selecting a candidate from among several candidate positions for enemy character appearance is altered. Furthermore, the components common to the above embodiment are denoted by the same reference numerals, and descriptions therefor will be omitted.

The appearance setting unit 204 selects at random from among position candidates for enemy character appearance stored in the storage unit 201 one position from within a predetermined permissible range that includes the candidate position closest to the reference distance calculated by the calculating unit 203, and stores the selected position in the storage unit 201 as the position of the new enemy character.

Figure 12:
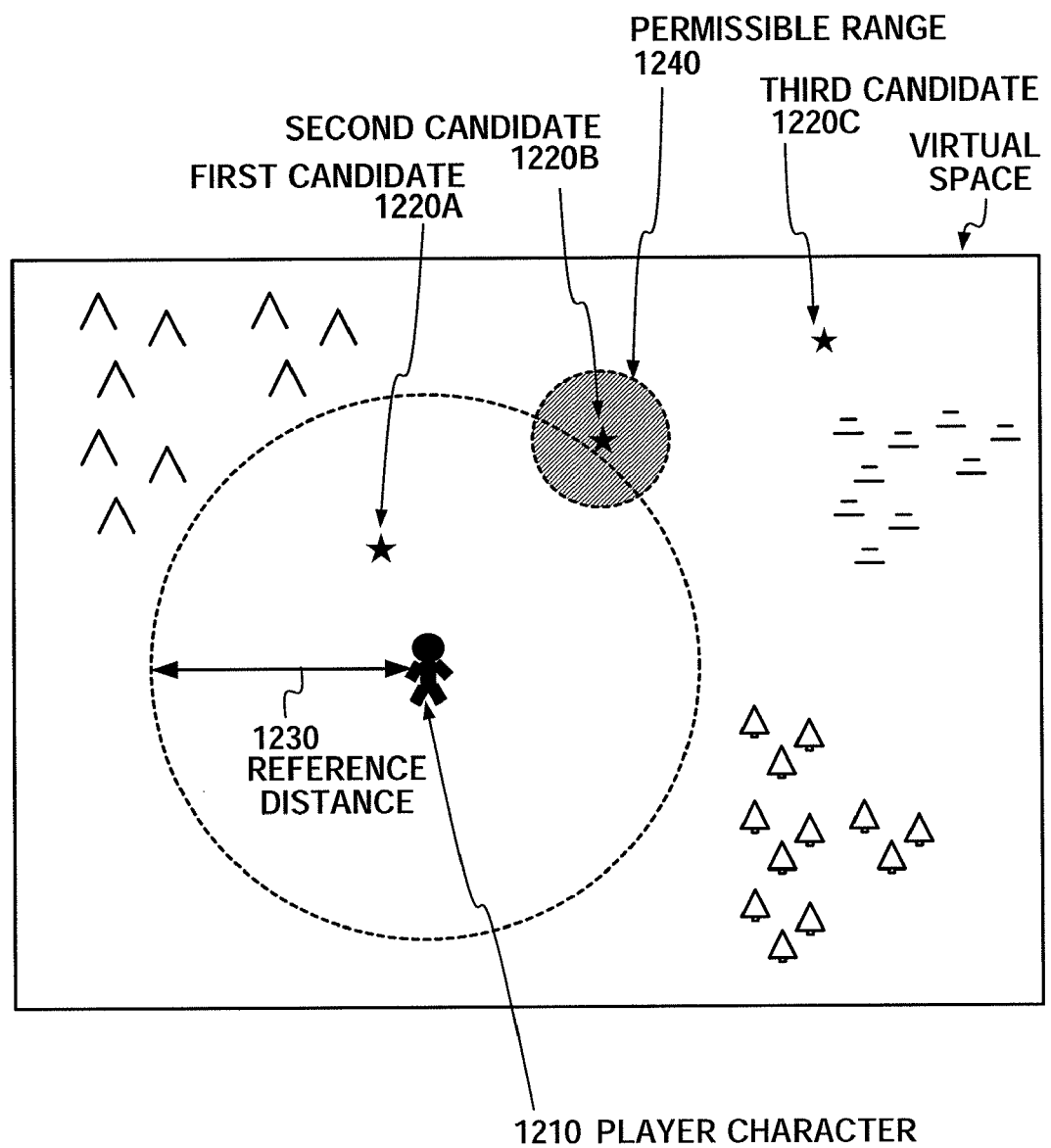
FIG. 12 A diagram illustrating an example of a relationship between the reference distance, the position candidates for new enemy character appearance, and the permissible range.

FIG. 12 is a diagram illustrating an example of a relationship between a reference distance 1230 from a player character 1210, a position candidate 1220 for new enemy character appearance, and a permissible range 1240. Each of the stars shown in the figure indicates one candidate 1220 of a position where an enemy character may be newly caused to appear, and in this example the three candidates 1220A, 1220B, and 1220C exist. First, the measuring unit 202 measures the elapsed time from the moment of the game start to the present. The calculating unit 203 then obtains the reference distance 1230 corresponding to the measured elapsed time. The dashed curve shown in this figure is a circle having a radius of the obtained reference distance 1230. Then, the appearance setting unit 204 selects from among the candidate positions 1220 for enemy character appearance the candidate closest to the reference distance 1230, that is, the candidate that is closest to the arc of the circle. In this figure, this is the second candidate 1220B. Further, the appearance setting unit 204 sets the predetermined permissible range 1240 that includes the position of the selected candidate 1220. In this figure, the area within the circle having a radius of a predetermined length and a center position of the second candidate 1220B is set as the permissible range 1240. Then, the appearance setting unit 204 selects at random one position from within the set permissible range 1240, establishing that position as the appearance position of the new enemy character.

In this example the shape of the permissible range 1240 is an area within a circle having a radius of a predetermined length and being centered on the position of the candidate 1220 stored in the storage unit 201. However, this is merely an example and the shape may be an arbitrary shape. Further, while in this figure the positions of the candidates 1220 are indicated by stars, the circle showing the reference distance 1230 is indicated by a dashed curve, and the permissible range 1240 is indicated by a shaded area, these are merely for ease of explanation and do not appear on the actual game screen.

For example, in a case where another character object is already disposed at the candidate position which is stored in the storage unit 201 and where an enemy character is to be newly caused to appear, the appearance setting unit 204 can set the permissible range to the area around the candidate position and avoid the position where another character object has already been disposed and select at random one position from within the permissible range set in the vicinity thereof.

Specifically, in step S1005 of the above embodiment, the appearance setting unit 204 determines whether or not another character object is already disposed at the selected candidate position. In a case where another character is already disposed in that position, the appearance setting unit 204 in step S1006 sets a predetermined permissible range that includes the position of the selected candidate, and then selects one position from within that permissible range and sets it as the appearance position of the new enemy character. In a case where no other character is disposed at the position, the appearance setting unit 204 sets the candidate position selected in step S1004 as the appearance position of the new enemy character. The processing of the other steps is the same as that of the above embodiment, and details thereof will be omitted. In this manner, the character objects never overlap at the same position.

Even in a case, for example, where the game is designed so that a candidate position, stored in the storage unit 201, for new enemy character appearance is specified by an area having a certain width rather than by the coordinate values of one point, the present embodiment is effective. That is, the present embodiment makes it possible to set the position where the enemy character is to be produced without using absolute coordinate values.

Further, priority levels may be set in advance for areas within the permissible range, and the appearance setting unit 204 may select a candidate based on priority level. In such a case, the storage unit 201 stores the priority levels of a predetermined number of levels in association with each position of the areas within the permissible range. Then, the selection probability is set so that the higher the priority level is, the higher the selection probability is. For example, the appearance setting unit 204 sets as the permissible range an area that is within the circle having a radius R0 and being centered on the position of a certain candidate. Further, the appearance setting unit 204 sets lengths R1 and R2 that satisfy a relationship 0<R1<R2<R0. The appearance setting unit 204 then (1) sets the selection probability of the points within the concentric circle having a radius R1 and being centered on the position of that candidate as P1, (2) the selection probability of the section that is within the concentric circle of radius R2 that is not included in the concentric circle of radius R1 as P2, and (3) the selection probability of the section that is within the concentric circle of radius R0 and that is not included in the concentric circle of radius R2 as (1−P1−P2), where 0≦P1, P2≦1, and P1+P2≦1. While in this example three concentric circles are used, an arbitrary shape and an arbitrary number of graphics may be used.

In this manner, according to the present embodiment, even under circumstances where the enemy character cannot be disposed on the candidate position for new enemy character appearance, the game device 200 appropriately selects an appearance position of the enemy character, thereby ensuring that the game is not too difficult or too easy. For example, regardless if the player is a beginner player or an advanced player, the game device 200 causes the enemy character to appear in such a manner as not to greatly disrupt the game balance, making the game interesting. Note that the present embodiment may be easily combined with other embodiments in its implementation.

Embodiment 6

The following describes another embodiment of the present invention. The present embodiment is another embodiment wherein the method of selection on selecting any one from among several candidate positions for enemy character appearance. The components common to the above embodiment are denoted by the same reference numerals, and descriptions thereof will be omitted.

The appearance setting unit 204 obtains the direction in which the player character moves within a predetermined period of time from the present. Then, the appearance setting unit 204 selects at random one candidate position in such a manner that the more in the obtained direction the candidate is, the higher the probability of being selected is, and stores the selected candidate position in the storage unit 201 as the new enemy character position.

Specifically, the appearance setting unit 204 stores the position of the player character in the RAM 103 as history information, at periodic timing, such as the timing of monitor vertical synchronizing interrupts. Then, the appearance setting unit 204 obtains the movement direction of the player character from this history information. For example, it is assumed that the position of the player character at a certain time T1 is point PA (X1, Y1, Z1), and the position of the player character at the time T2 after time T1 is point PB (X2, Y2, Z2). The orientation of the direction vector (X2−X1, Y2−Y1, Z2−Z1) from point PA to point PB is set as the movement direction of the player character.

The method of determining the movement direction is not limited to the above method; other methods may also be used. For example, the appearance setting unit 204 may store the positions of three or more points as the history of the position of the player character, and obtain the movement direction based on the degree of distribution of these points. The time interval for acquiring the history of the position is preferably uniform, and the time length is arbitrary.

Figure 13:
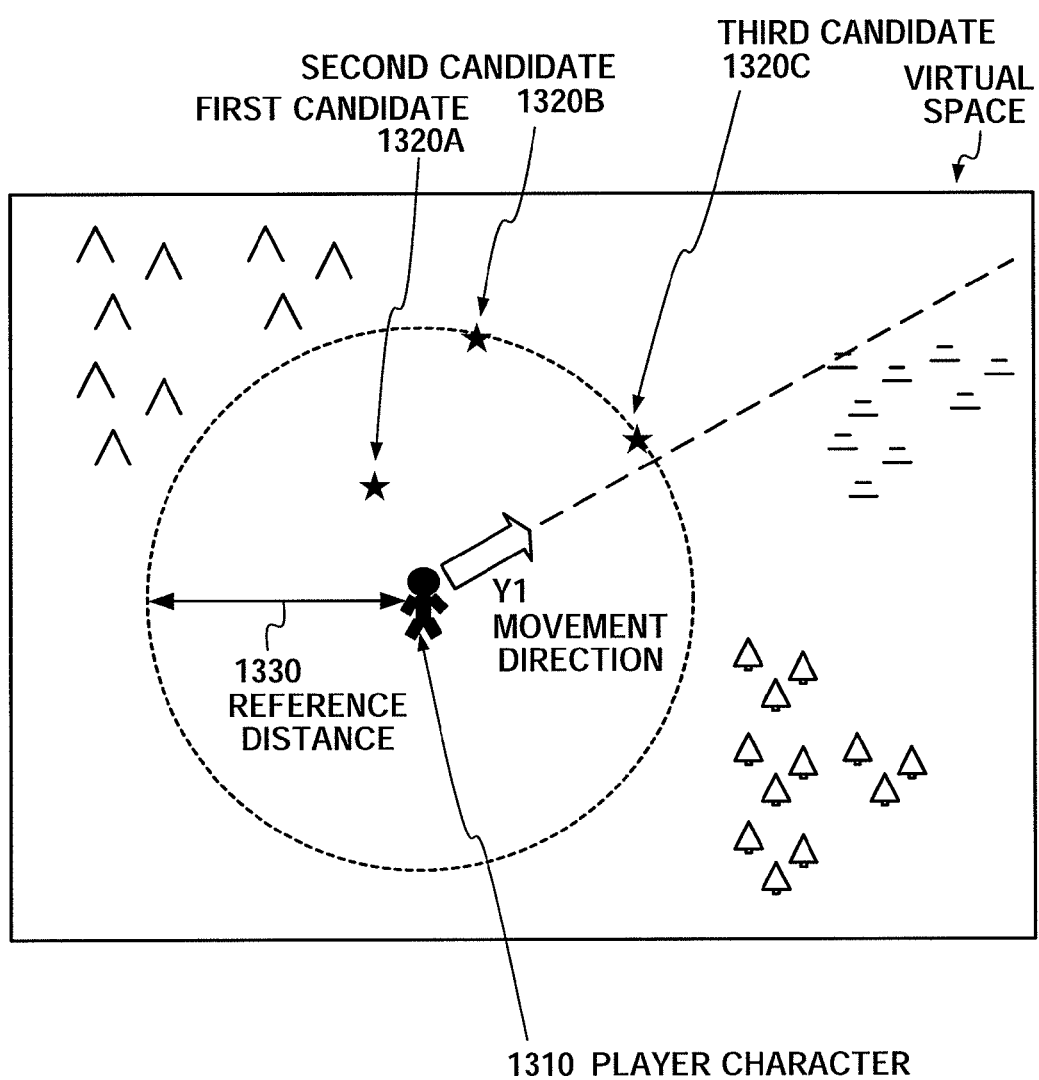
FIG. 13 A diagram illustrating an example of a relationship among the reference distance, the position candidates for new enemy character appearance, and the movement direction of the player character.

FIG. 13 is a diagram illustrating an example of a relationship between a reference distance 1330 from a player character 1310, a candidate position 1320 for new enemy character appearance, and the movement direction of the player character 1310. The arrow Y1 in the figure indicates the movement direction of the player character obtained by the appearance setting unit 204. First, the measuring unit 202 measures the elapsed time from the moment of the game start to the present. The calculating unit 203 then calculates the reference distance 1330 corresponding to the measured elapsed time. The dashed curve shown in this figure is a circle having a radius of the obtained reference distance 1330. Then, the appearance setting unit 204 selects from among the first to third candidates 1320A, 1320B, and 1320C the candidate closest to the reference distance 1330, that is, the candidate that is closest to the arc of the circle. In this figure, there are two selected candidates: the second candidate 1320B and the third candidate 1320C. Furthermore, the appearance setting unit 204 selects at random from among the candidates closest to the reference distance 1330 one candidate as the new enemy character appearance position, applying weight in such a manner that the closer in the movement direction Y1 the candidate is, the larger the probability of being selected is. Then, the appearance setting unit 204 updates the storage unit 201 so that the position of the selected candidate 1320 will be the output position of the new enemy character. The output unit 208 acquires the position of the player character 1310 and the position of the enemy character stored in the storage unit 201, and generates and outputs a game screen in which the respective characters are arranged.

Further, while in this figure the positions of the candidates 1320 are indicated by stars, the circle showing the reference distance 1330 is indicated by a dashed curve, and the movement direction is indicated by an arrow Y1, these are merely for ease of explanation and do not appear on the actual game screen.

Further, the appearance setting unit 204 may also apply weight to each candidate in such a manner that the closer in a movement direction of the player character a candidate is, the higher the probability of being selected is, and that the closer to the calculated distance a candidate locates at, the higher the probability of being selected is.

Further, rather than selecting at random one candidate upon applying weight to the probability of selection, the appearance setting unit 204 may also select the candidate that is closest in the movement direction as the appearance position of the new enemy character. The appearance setting unit 204 may also apply weight so that the probability of selection is set in such a manner that the closer in the movement direction a candidate is, the lower the probability of being selected is. Or, the appearance setting unit 204 may apply weight according to the difference in the type of area in which the enemy character can appear (for example, forest, grass, pond, etc.).

In place of the movement direction of the player character, the line of sight of the player character may also be used. The CPU 101 sets the viewpoint as the point where the player character positioned within the virtual space observes the state within the virtual space. The virtual image viewed in the line of sight from this viewpoint may be used for the display of 3D graphics, for example. The line of sight can be arbitrarily changed based on the operation of the controller 105 by the player. Then, the appearance setting unit 204 acquires the line of sight set by the user, applies weight in such a manner that the closer in the direction of the line of sight a candidate locates at, the higher the probability of being selected is, and selects at random one candidate as the appearance position of the new enemy character. In such a case as well, the candidate closest to the movement direction may also be selected as the appearance position of the new enemy character. When the line of sight is used in this manner, the enemy character can be readily caused to appear within the game screen (within the field of vision) viewed in the line of sight from the player character viewpoint, thereby making it possible to set a game having a decreased level of difficulty for a beginner player. Further, the enemy character can also be readily caused to appear outside the field of vision of the player character, thereby making it possible to set a game having an increased level of difficulty for an advanced player.

In this manner, according to the present embodiment, the game device 200 causes an enemy character to appear in the direction in which the player character moves, thereby ensuring that the game is not too difficult or too easy. For example, regardless if the player is a beginner player or an advanced player, the game device 200 causes the enemy character to appear in such a manner as not to greatly disrupt the game balance, thereby making the game interesting. The present embodiment may be simply implemented in combination with other embodiments.

The present invention is not limited to the above-described embodiments, and various modifications and applications can be made. Further, each of the elements of the above-described embodiments may also be freely used in combination.

While the flowcharts of each of the above embodiments do not include processing that makes the enemy character disappear, the deleting unit 207 can delete the data indicating the position of the enemy character from the storage unit 201 at an arbitrary timing in accordance with the development of the game executed by the CPU 101, and the output unit 208 can remove the enemy character from the game screen. That is, the CPU 101 can remove the enemy character at an arbitrary timing. For example, the deleting unit 207 deletes the data indicating the position of the enemy character from the storage unit 201 and removes the enemy character in a case where the player character has damaged the enemy character to a predetermined level or higher, or in a case where a predetermined amount of time required for the enemy character to naturally expire has elapsed.

While the appearance setting unit 204 selects the appearance position of an enemy character in each of the above-described embodiments, the present invention may be used as a selection method of an appearance position in a case where another arbitrary character object is to be caused to appear, not limited to an enemy character. The above-described enemy character may include character objects that potentially have an adverse effect on the player character, such as lightning, a pit, a trap, or an obstacle.

While the appearance setting unit 204 selects one position as the appearance location of the enemy character in each of the above embodiments, the appearance setting unit 204 may select M number of positions or more (where M is an integer greater than or equal to 2 and less than or equal to the number of candidates). In such a case, the appearance setting unit 204 may select at step S604 from among the candidates stored in the storage unit 201 the upper M candidates closest to the reference distance, and set these M positions as appearance positions of new enemy characters. The selected M number of positions are preferably enough away from each other so that the enemy characters do not overlap when they are arranged.

While one player character is used in each of the above embodiments, a plurality of player characters may be used, such as in a game in which a plurality of players can participate.

The program for operating the game device 200 as a system, in whole or in part, may be recorded on a computer readable information storage medium, such as a memory card, CD-ROM, DVD, or MO (Magneto Optical disk), distributed, installed on a different computer, and operated as the above-described means or used to execute the above-described processing.

Furthermore, the program may be stored on a disk device, etc., of a server on the Internet and, for example, superimposed on carrier waves and downloaded to a computer.

The present invention claims priority based on Japanese Patent Application No. 2006-248614, the entire contents of which are incorporated herein by reference.

INDUSTRIAL APPLICABILITY

As explained above, according to the present invention, it is possible to position character objects in such a manner to ensure that a game will not be too difficult or too easy for the users.

The invention claimed is:

1. A game device that executes a game wherein a player character configured to move based on player instructions and an enemy character exist within a virtual space, comprising:
 a storage unit which stores a position of the player character, a position of the enemy character, and a plurality of potential candidate positions for an appearance of the enemy character, within the virtual space;
 a measuring unit which measures an elapsed time of the game from an initial time;
 a calculating unit which calculates a distance that increases as the measured elapsed time increases; and
 an appearance setting unit which selects one of the plurality of potential candidate positions, where the selected one of the plurality of potential candidate positions is the potential candidate position whose distance from the player character is closest to the calculated distance, and which stores the selected one of the plurality of potential candidate positions as a position of a new enemy character, to the storage unit.

2. The game device according to claim 1, wherein the appearance setting unit stores the position of the new enemy character in the storage unit in such a manner that the number of positions of the enemy character stored in the storage unit does not exceed a predetermined threshold.

3. The game device according to claim 1, further comprising:
 a moving unit which moves the position of the enemy character closer to the position of the player character and updates information stored in the storage unit, in a case where the position of the player character is a predetermined distance or more away from the position of the enemy character.

4. The game device according to claim 1, wherein the appearance setting unit, in a case where of the stored potential candidate positions for enemy character appearance there are a plurality of potential candidate positions whose distances from the stored player character are same, selects at random a candidate position from potential candidate positions and stores, as the position of the new enemy character, the selected candidate position to the storage unit.

5. The game device according to claim 4, wherein the appearance setting unit obtains the movement direction in which the player character moves within a predetermined time period from present, selects at random a position in such a manner that the more in the obtained direction a candidate is, the higher the probability of being selected is, and stores the selected candidate position to the storage unit as the position of the new enemy character.

6. The game device according to claim 1, wherein the appearance setting unit selects at random, from among the stored potential candidate positions for enemy character appearance, a position from among positions included within a predetermined permissible range from a candidate position that locates at a distance that is closest to the calculated distance, and stores the selected position to the storage unit as the position of the new enemy character.

7. The game device according to claim 6, wherein the appearance setting unit selects at random a position in such a manner that the closer to the calculated distance a candidate locates at, the higher the probability of being selected is, and stores the selected candidate position to the storage unit as the position of the new enemy character.

8. The game device according to claim 1, wherein the appearance setting unit, in a case where of the stored potential candidate positions for enemy character appearance there are a plurality of stored candidate positions that are away by the calculated distance or more, selects at random a candidate position from the plurality of candidates and stores the selected candidate position to the storage unit as the position of the new enemy character.

9. The game device according to claim 1, further comprising a deleting unit which deletes a position of the enemy character from the storage unit in a case where the player character wins by attacking the enemy character or in a case where a predetermined length of time has elapsed from a moment the appearance setting unit stored the position of the enemy character to the storage unit.

10. A game processing method executed on a game device comprising a storage unit and a processing unit, which executes a game wherein a player character configured to move based on player instructions and an enemy character exist within a virtual space, the game processing method comprises:
- a storing step of storing in the storage unit a position of the player character, a position of the enemy character, and a plurality of potential position candidates for an appearance of the enemy character, within the virtual space;
- a measuring step, performed by the processing unit, of measuring an elapsed time of the game from an initial time;
- a calculating step, performed by the processing unit, of calculating a distance that increases as the measured elapsed time increases;
- an appearance setting step, performed by the processing unit, of selecting one of the plurality of potential candidate positions, where the selected one of the plurality of potential candidate positions is the potential candidate position whose distance from the player character is closest to the calculated distance and storing the selected one of the plurality of potential candidate positions as a position of a new enemy character to the storage unit; and,
- an output step of acquiring the selected one of the plurality of potential candidate positions and the position of the player character from the storage unit and generating a game screen containing a representation of the player character and the enemy character as a function thereof.

11. A non-transitory computer-readable information recording medium storing a program for controlling a computer which executes a game wherein a player character configured to move based on player instructions and an enemy character exist within a virtual space, to function as:
- a storage unit which stores a position of the player character, a position of the enemy character, and a plurality of potential candidate positions for an appearance of the enemy character, within the virtual space;
- a measuring unit which measures an elapsed time of the game from an initial time;
- a calculating unit which calculates a distance that increases as the measured elapsed time increases; and
- an appearance setting unit which selects one of the plurality of potential candidate positions, where the selected one of the plurality of potential candidate positions is the potential candidate position whose distance from the player character is closest to the calculated distance, and which stores the selected one of the plurality of potential candidate positions as a position of a new enemy character to the storage unit.

* * * * *